(12) United States Patent
Rhoads et al.

(10) Patent No.: US 7,770,013 B2
(45) Date of Patent: Aug. 3, 2010

(54) DIGITAL AUTHENTICATION WITH DIGITAL AND ANALOG DOCUMENTS

(75) Inventors: Geoffrey B. Rhoads, West Linn, OR (US); J. Scott Carr, Tualatin, OR (US); Burt W. Perry, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 806 days.

(21) Appl. No.: 10/656,930

(22) Filed: Sep. 4, 2003

(65) Prior Publication Data

US 2004/0153649 A1  Aug. 5, 2004

Related U.S. Application Data

(63) Continuation-in-part of application No. 10/164,899, filed on Jun. 4, 2002, now Pat. No. 7,043,052, which is (Continued)

(60) Provisional application No. 60/198,138, filed on Apr. 17, 2000, provisional application No. 60/198,849, filed on Apr. 21, 2000, provisional application No. 60/109,259, filed on Nov. 19, 1998, provisional application No. 60/112,955, filed on Dec. 18, 1998, provisional application No. 60/178,028, filed on Jan. 26, 2000, provisional application No. 60/134,782, filed on May 19, 1999.

(51) Int. Cl.
  *H04L 9/00* (2006.01)
(52) U.S. Cl. ........................ 713/176; 713/178
(58) Field of Classification Search ................ 713/161, 713/180, 155, 168–170, 176, 185, 193
See application file for complete search history.

(56) References Cited

U.S. PATENT DOCUMENTS 4,590,366 A    5/1986  Rothfjell (Continued)

FOREIGN PATENT DOCUMENTS

DE         29 43 436           5/1981

(Continued)

OTHER PUBLICATIONS

Chow et al., "Forgery and Tamper-Proof Identification Document," IEEE Proc. 1993 Int. Carnahan Conf. on Security Technology, Oct. 13-15, 1993, pp. 11-14.

(Continued)

*Primary Examiner*—Gilberto Barron, Jr.
*Assistant Examiner*—Venkat Perungavoor

(57) ABSTRACT

The present invention relates generally to systems for creating and authenticating printed objects using authentication information. One implementation recites: An apparatus for determining authenticity of a digital representation of an object. The digital representation includes embedded first authentication information. The apparatus includes: a storage system in which stored second authentication information is associated with stored reference codes; and a processor which receives the digital representation and a reference code associated therewith. The processor includes: an authentication information reader, and the processor: i) employs the reference code to retrieve the second authentication information associated therewith from the storage system, ii) employs the authentication information reader to recover the embedded first authentication information, and iii) employs recovered first authentication information and the second authentication information to determine authenticity of the digital representation. Other implementations are provided and claimed as well.

27 Claims, 15 Drawing Sheets

Related U.S. Application Data a continuation of application No. 09/198,022, filed on Nov. 23, 1998, now Pat. No. 6,546,112, which is a continuation of application No. 08/763,847, filed on Dec. 4, 1996, now Pat. No. 5,841,886, which is a continuation of application No. 08/512,993, filed on Aug. 9, 1995, now abandoned, application No. 10/656,930, which is a continuation-in-part of application No. 09/775,934, filed on Feb. 2, 2001, now Pat. No. 6,823,075, which is a continuation-in-part of application No. 09/625,577, filed on Jul. 25, 2000, now Pat. No. 6,788,800, application No. 10/656,930, which is a continuation-in-part of application No. 09/837,564, filed on Apr. 17, 2001, now abandoned, and a continuation-in-part of application No. 09/503,881, filed on Feb. 14, 2000, now Pat. No. 6,614,914, which is a continuation-in-part of application No. 09/186,962, filed on Nov. 5, 1998, now Pat. No. 7,171,016, which is a continuation of application No. 08/649,419, filed on May 16, 1996, now Pat. No. 5,862,260, which is a continuation-in-part of application No. 08/637,531, filed on Apr. 25, 1996, now Pat. No. 5,822,436, which is a continuation-in-part of application No. 08/512,993, filed on Aug. 9, 1995, now abandoned, application No. 10/656,930, which is a continuation-in-part of application No. 09/571,422, filed on May 15, 2000, now Pat. No. 6,947,571, which is a continuation-in-part of application No. 09/343,104, filed on Jun. 29, 1999, now abandoned, and a continuation-in-part of application No. 09/342,688, filed on Jun. 29, 1999, now Pat. No. 6,650,761, and a continuation-in-part of application No. 09/343,101, filed on Jun. 29, 1999, now abandoned, and a continuation-in-part of application No. 09/314,648, filed on May 19, 1999, now Pat. No. 6,681,028, application No. 10/656,930, and a continuation-in-part of application No. 10/011,129, filed on Nov. 9, 2001, now Pat. No. 6,970,573, which is a continuation of application No. 09/442,780, filed on Nov. 18, 1999, now Pat. No. 6,389,151, and a continuation-in-part of application No. 09/074,034, filed on May 6, 1998, now Pat. No. 6,449,377, and a continuation-in-part of application No. 09/763,847, filed on Feb. 27, 2001, now abandoned, which is a continuation of application No. 08/512,993, filed on Aug. 9, 1995, now abandoned, application No. 10/656,930, which is a continuation-in-part of application No. 09/465,418, filed on Dec. 16, 1999, now abandoned, application No. 10/656,930, which is a continuation-in-part of application No. 10/147,228, filed on May 15, 2002, now Pat. No. 7,171,018, which is a continuation-in-part of application No. 09/670,115, filed on Sep. 26, 2000, now abandoned, and a continuation-in-part of application No. 09/563,664, filed on May 2, 2000, now Pat. No. 6,505,160, and a continuation-in-part of application No. 09/476,686, filed on Dec. 30, 1999, now Pat. No. 7,562,392, and a continuation-in-part of application No. 08/746,613, filed on Nov. 12, 1996, now Pat. No. 6,122,403, which is a continuation-in-part of application No. 08/649,419, filed on May 16, 1996, now Pat. No. 5,862,260, which is a continuation-in-part of application No. PCT/US96/06618, filed on May 7, 1996, and a continuation-in-part of application No. 08/508,083, filed on Jul. 27, 1995, now Pat. No. 5,841,978.

(56) References Cited

U.S. PATENT DOCUMENTS

| | | | |
|---|---|---|---|
| 4,675,746 | A | 6/1987 | Tetrick et al. |
| 5,113,445 | A | 5/1992 | Wany |
| 5,237,164 | A | 8/1993 | Takada |
| 5,284,364 | A | 2/1994 | Jain |
| 5,329,108 | A | 7/1994 | Lamoure |
| 5,412,727 | A * | 5/1995 | Drexler et al. ............... 713/186 |
| 5,436,970 | A | 7/1995 | Ray et al. |
| 5,467,447 | A * | 11/1995 | Vogel .......................... 715/500 |
| 5,475,205 | A * | 12/1995 | Behm et al. .................. 235/375 |
| 5,490,217 | A | 2/1996 | Wang et al. |
| 5,505,494 | A | 4/1996 | Belluci et al. |
| 5,604,802 | A * | 2/1997 | Holloway ..................... 705/66 |
| 5,613,004 | A * | 3/1997 | Cooperman et al. ........... 380/28 |
| 5,617,119 | A | 4/1997 | Briggs et al. |
| 5,636,292 | A | 6/1997 | Rhoads |
| 5,652,626 | A | 7/1997 | Kawakami et al. |
| 5,721,788 | A | 2/1998 | Powell et al. |
| 5,787,186 | A | 7/1998 | Schroeder |
| 5,799,092 | A | 8/1998 | Kristol et al. |
| 5,825,892 | A | 10/1998 | Braudaway et al. |
| 5,835,639 | A | 11/1998 | Honsinger et al. |
| 5,862,260 | A | 1/1999 | Rhoads |
| 5,907,149 | A | 5/1999 | Marckini |
| 5,912,972 | A | 6/1999 | Barton |
| 5,912,974 | A | 6/1999 | Holloway et al. |
| 5,933,798 | A | 8/1999 | Linnartz |
| 5,943,422 | A | 8/1999 | Van Wie et al. |
| 6,005,936 | A | 12/1999 | Shimizu |
| 6,024,287 | A | 2/2000 | Takai et al. |
| 6,064,764 | A | 5/2000 | Bhaskaran et al. |
| 6,101,602 | A | 8/2000 | Fridrich |
| 6,122,403 | A | 9/2000 | Rhoads |
| 6,226,387 | B1 | 5/2001 | Tewfik et al. |
| 6,243,480 | B1 | 6/2001 | Zhao et al. |
| 6,275,599 | B1 | 8/2001 | Adler |
| 6,285,775 | B1 | 9/2001 | Wu et al. |
| 6,292,092 | B1 | 9/2001 | Chow et al. |
| 6,321,981 | B1 | 11/2001 | Ray et al. |
| 6,332,030 | B1 | 12/2001 | Manjunath et al. |
| 6,332,031 | B1 | 12/2001 | Rhoads et al. |
| 6,385,329 | B1 | 5/2002 | Sharma |
| 6,487,301 | B1 | 11/2002 | Zhao |
| 6,504,941 | B2 | 1/2003 | Wong |
| 6,683,966 | B1 | 1/2004 | Tian et al. |
| 6,714,683 | B1 | 3/2004 | Tian et al. |
| 6,748,533 | B1 | 6/2004 | Wu |
| 6,751,336 | B2 | 6/2004 | Zhao |
| 7,043,052 | B2 | 5/2006 | Rhoads |
| 2002/0056041 | A1 | 5/2002 | Moskowitz |
| 2002/0122568 | A1 | 9/2002 | Zhao |

FOREIGN PATENT DOCUMENTS

| EP | 650146 A1 * | 4/1995 |
|---|---|---|
| EP | 0891071 | 1/1999 |
| EP | 0953938 | 11/1999 |
| JP | 3-185585 | 8/1991 |
| WO | WO00/33282 | 6/2000 |
| WO | WO00/75925 | 12/2000 |

OTHER PUBLICATIONS

Kawaguchi et al., "Principle and Applications of BPCS-Steganography," Proc. SPIE vol. 3528: Multimedia Systems and Applications, Nov. 2-4, 1998, pp. 464-473.

Komatsu et al., "A Proposal on Digital Watermarking in Document Image Communication and Its Application to Realizing a Signature," Electronics and Communications in Japan, Part I, vol. 73, No. 5, 1990, pp. 22-23.

Kundur et al., "Digital Watermarking for Telltale Tamper Proofing and Authentication", IEEE, vol. 87, No. 7, pp. 1167-1180.

Kundur et al., "Digital Watermarking Using Multiresolution Wavelet Decomposition," Proc. of 1998 IEEE Int. Conf. on Acoustics, Speech and Signal Processing, ICASSP '98, pp. 2969-2972, vol. 5.

Matsui et al., "Embedding a Signature to Pictures Under Wavelet Transformation," *Transactions of the Institute of Electronics Information and Communication Engineers D-II*, vol. J79D-II, No. 6, Jun. 1996, pp. 1017-1024.

Matsui et al., "Use of the Wavelet Transformation to Embed Signatures in Images," Systems and Computers in Japan, Jan. 1997, vol. 28, No. 1, pp. 87-94.

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979.

Aug. 22, 2003, 37 CFR 1.607 Amendment and 37 CFR 1.607 Request for an Interference with a Patent from U.S. Appl. No. 10/164,899.

Dec. 12, 2003 Office Action from U.S. Appl. No. 10/164,899.

Jun. 11, 2004 Declaration of Garth Zambory and Aug. 30, 2004 Supplemental Declaration of Garth Zambory, each from U.S. Appl. No. 10/164,899.

Jun. 11, 2004 Declaration of Bert Shaw, PhD. (with attachments) from U.S. Appl. No. 10/164,899.

Jun. 14, 2004 Amendment from U.S. Appl. No. 10/164,899.

Oct. 4, 2004 Office Action from U.S. Appl. No. 10/164,899.

Mar. 2, 2005 Amendment from U.S. Appl. No. 10/164,899.

Jun. 28, 2005 Office Action from U.S. Appl. No. 10/164,899.

Nov. 21, 2005 Amendment Accompanying Request for Continued Examination from U.S. Appl. No. 10/164,899.

Dec. 9, 2005, Notice of Allowance and Fees Due from U.S. Appl. No. 10/164,899.

* cited by examiner

TYPICAL TRANSACTION STEPS

1. READER SCANS IMAGE ON CARD, STORES IN MEMORY, EXTRACTS PERSON'S ID
2. OPTIONAL: USER KEYS IN PIN NUMBER
3. READER CALLS CENTRAL ACCOUNT DATA NETWORK, HANDSHAKES
4. READER SENDS ID, (PIN), MERCHANT INFORMATION, AND REQUESTED TRANSACTION AMOUNT TO CENTRAL NETWORK
5. CENTRAL NETWORK VERIFIES ID, PIN, MERCHANT INFO, AND ACCOUNT BALANCE
6. IF OK, CENTRAL NETWORK GENERATES TWENTY-FOUR SETS OF SIXTEEN DISTINCT RANDOM NUMBERS, WHERE THE RANDOM NUMBERS ARE INDEXES TO A SET OF 64K ORTHOGONAL SPATIAL PATTERNS
7. CENTRAL NETWORK TRANSMITS FIRST OK, AND THE SETS OF RANDOM NUMBERS
8. READER STEPS THROUGH THE TWENTY-FOUR SETS
  8A. READER ADDS TOGETHER SET OF ORTHOGONAL PATTERNS
  8B. READER PERFORMS DOT PRODUCT OF RESULTANT PATTERN AND CARD SCAN, STORES RESULT
9. READER TRANSMITS THE TWENTY-FOUR DOT PRODUCT RESULTS TO CENTRAL NETWORK
10. CENTRAL NETWORK CHECKS RESULTS AGAINST MASTER
11. CENTRAL NETWORK SENDS FINAL APPROVAL OR DENIAL
12. CENTRAL NETWORK DEBITS MERCHANT ACCOUNT, CREDITS CARD ACCOUNT

FIG. 7

THE NEGLIGIBLE-FRAUD CASH CARD SYSTEM

A BASIC FOUNDATION OF THE CASH CARD SYSTEM IS A 24-HOUR INFORMATION NETWORK, WHERE BOTH THE STATIONS WHICH CREATE THE PPHYSICAL CASH CARDS, 950, AND THE POINT-OF-SALES, 984, ARE ALL HOOKED UP TO THE SAME NETWORK CONTINUOUSLY

DIGITAL AUTHENTICATION WITH DIGITAL AND ANALOG DOCUMENTS

RELATED APPLICATION DATA

The present application is a continuation in part of U.S. patent application Ser. No. 10/164,899, filed Jun. 4, 2002 (published as U.S. 2003-0002710 A1). The application Ser. No. 10/164,899 is a continuation of U.S. patent application Ser. No. 09/198,022, filed Nov. 23, 1998 (now U.S. Pat. No. 6,546,112), which is a continuation of U.S. patent application Ser. No. 08/763,847 (now U.S. Pat. No. 5,841,886), filed Dec. 4, 1996, which is a continuation of U.S. patent application Ser. No. 08/512,993, filed Aug. 9, 1995 (now abandoned). Each of these patent documents is herein incorporated by reference.

This patent application is also a continuation in part of U.S. patent application Ser. No. 09/775,934, filed Feb. 2, 2001 (published as US 2002-0012445 A1). The patent application Ser. No. 09/775,934 is a continuation in part of U.S. patent application Ser. No. 09/625,577, filed on Jul. 25, 2000. Each of these patent documents is herein incorporated by reference.

This patent application is also a continuation in part of U.S. patent application Ser. No. 09/837,564, filed Apr. 17, 2001 (published as US 2002-0009208 A1). The application Ser. No. 09/837,564 claims the benefit of U.S. Provisional Patent Application Nos. 60/198,138, filed Apr. 17, 2000, and 60/198,849, filed Apr. 21, 2000. The application Ser. No. 09/837,564 is also a continuation in part of U.S. patent application Ser. No. 09/503,881, filed Feb. 14, 2000 (now U.S. Pat. No. 6,614,914), which is a continuation in part of U.S. patent application Ser. No. 09/186,962, filed Nov. 5, 1998, which is a continuation of U.S. patent application Ser. No. 08/649,419, filed May 16, 1996 (now U.S. Pat. No. 5,862,260), which is a continuation in part of U.S. patent application Ser. No. 08/637,531, filed Apr. 25, 1996 (now U.S. Pat. No. 5,822, 436), which is a continuation in part of U.S. patent application Ser. No. 08/512,993 filed Aug. 9, 1995 (abandoned in favor of FWC Ser. No. 08/763,847, now issued as U.S. Pat. No. 5,841, 886). Each of these patent documents is herein incorporated by reference.

This patent application is also a continuation in part of U.S. patent application Ser. No. 09/571,422, filed May 15, 2000. The application Ser. No. 09/571,422 is a continuation in part of each of U.S. patent application Ser. Nos. 09/343,104, 09/342,688 and 09/343,101, each filed Jun. 29, 1999, and 09/314,648, filed May 19, 1999. Each of these patent documents is herein incorporated by reference.

This patent application is also a continuation in part of U.S. patent application Ser. No. 10/011,129, filed Nov. 9, 2001 (published as US 2002-0061120 A1). The application Ser. No. 10/011,129 is a continuation of U.S. patent application Ser. No. 09/442,780, filed Nov. 18, 1999 (now U.S. Pat. No. 6,389,151). The application Ser. No. 09/442,780 claims the benefit of U.S. Provisional Patent Application No. 60/109, 259 filed Nov. 19, 1998. The application Ser. No. 09/442,780 is also a continuation in part of U.S. patent application Ser. No. 09/074,034 filed May 6, 1998 (now U.S. Pat. No. 6,449, 377) and a continuation in part of U.S. patent application Ser. No. 09/763,847 filed Dec. 4, 1996 (now U.S. Pat. No. 5,841, 886), which is a continuation of U.S. patent application Ser. No. 08/512,993, filed Aug. 9, 1995. Each of these patent documents is herein incorporated by reference.

The present application is also a continuation in part of U.S. patent application Ser. No. 09/465,418, filed Dec. 16, 1999. The 09/465,418 claims the benefit of U.S. Provisional Patent Application No. 60/112,955, filed Dec. 18, 1998.

The present invention is also a continuation in part of U.S. patent application Ser. No. 10/147,228, filed May 15, 2002 (published as US 2003-0012403 A1). The application Ser. No. 10/147,228 is a continuation in part of U.S. patent application Ser. No. 09/670,115, filed Sep. 26, 2000 (now abandoned). The application Ser. No. 10/417,288 is also a continuation in part of U.S. patent application Ser. No. 09/563, 664, filed May 2, 2000 (issued as U.S. Pat. No. 6,505,160), and which claims the benefit of U.S. Provisional Application No. 60/178,028, filed Jan. 26, 2000. The application Ser. No. 09/563,664 is a continuation in part of U.S. patent application Ser. No. 09/476,686, filed Dec. 30, 1999, which claims priority to U.S. Provisional Application No. 60/134,782, filed May 19, 1999. Application Ser. No. 09/563,664 is also a continuation in part of U.S. patent application Ser. No. 08/746,613 filed Nov. 12, 1996 (now U.S. Pat. No. 6,122, 403), which is a continuation in part of U.S. patent application Ser. No. 08/649,419, filed May 16, 1996 (now U.S. Pat. No. 5,862,260), PCT Application PCT/US96/06618, filed May 7, 1996 (published as WO 96/36163), and U.S. patent application Ser. No. 08/508,083, filed Jul. 27, 1995 (now U.S. Pat. No. 5,841,978). Each of these patent documents is herein incorporated by reference.

The present application is also related to assignee's U.S. patent application Ser. No. 09/790,322, filed Feb. 21, 2001 (published as US 2001-0037313 A1). The application Ser. No. 09/790,322 claims the benefit of U.S. Provisional Patent Application No. 60/257,822, filed Dec. 21, 2000, and is a continuation in part of U.S. patent application Ser. No. 09/562,049, filed May 1, 2000. Each of these patent documents is herein incorporated by reference.

The subject matter of the present application is related to that disclosed in U.S. Pat. Nos. 5,862,260 and 6,614,914. Each of these patent documents is herein incorporated by reference.

TECHNICAL FIELD

The invention relates to methods for authenticating objects, and in particular, relates to methods for embedding security data into products, and methods for authenticating these products using the embedded security data.

BACKGROUND AND SUMMARY

Counterfeiting and piracy have a huge economic impact. While numerous product security features have been developed, there remains a demand for cost effective security measures that inhibit counterfeiting and piracy.

Research in the field of steganography (also called "data hiding") offers promising technology for combating counterfeiting and piracy. One form of steganography is referred to in popular literature as digital watermarking. Digital watermarking is a process for modifying a host signal or object to embed a machine-readable code into the host. The host may be modified such that the embedded code is imperceptible or nearly imperceptible to the ordinary observer upon viewing or playback, yet may be detected through an automated detection process.

Most commonly, digital watermarking is applied to media such as images, audio signals, and video signals. However, it may also be applied to other types of media, including documents (e.g., through subtle line, word or character shifting), software, multi-dimensional graphics models, and surface textures of objects.

The invention relates to methods for authenticating printed objects using digital watermarks embedded in the images on the objects. One aspect of the invention is a system for authenticating a printed object. The system includes a watermark decoder and a verification module. The watermark decoder detects a copy detection watermark in a printed object to determine whether the printed object has been reproduced. The verification module processes a message decoded from an authentication watermark on the printed object to authenticate the printed object or bearer of the printed object. The authentication and copy detection watermarks may be implemented as the same or different watermarks. For example, the copy detection watermark may be a fragile watermark that carries the message and that degrades in response to a reproduction operation, such as photocopying or scanning and then re-printing the object. Alternatively, the authentication and copy detection watermarks may be separate watermarks embedded in an image that is printed on the object. The authentication watermark, in some applications, includes an identifier that links the object to a database entry with related information about the object. This related information can be used to check the bearer of the object by comparing it with attributes of the bearer (such as a user ID or photo) or the validity of the object by comparing it with attributes that are visible or machine readable on the object.

Another aspect of the invention is a system for creating a printed object. The system includes a watermark encoder and communication application. The watermark encoder encodes a watermark in an image to be printed on a printed object. This watermark is used to authenticate the printed object. The communication application obtains an identifier from a database for embedding into a message payload of the watermark. It also provides to the database information to be associated with the identifier.

These and further features and aspects of the present invention will become even more apparent with reference to the following detailed description and accompanying drawings.

BRIEF DESCRIPTION OF THE DRAWINGS

FIGS. 4-8 detail aspects of a security card according to one embodiment of the present invention.

DETAILED DESCRIPTION

Introduction

The following sections describe a system and related methods for authenticating products. While the description illustrates the system with an example of packaged software product, it applies to a variety of types of objects. In this document, the term "product" broadly encompasses physical objects (e.g., goods), and other objects associated with them like packaging, tags, labels, documentation, and media supplied on, by, or with the object. Within this broad product context, the embedding process may encode security data on any of these types of products. To determine whether a product is authentic, the methods and systems described in this document can be used to evaluate security data embedded on the product itself, its packaging, labels, tags, media, etc. One implementation of these methods and secure products employs a form of steganography referred to as digital watermarking. However, other forms of steganography may be used as well. There are two principal parts of the product authentication architecture: 1) a system for embedding authentication data into the product; and 2) a system for authenticating the product.

Typically, product makers assign unique identifiers, such as product serial numbers, to each product. In the product security systems describe below, an embedder encodes the serial number as a form of machine readable security data into the product or its packaging. This embedded security data is then used to authenticate the product and/or control unauthorized use. In the case of software products, for example, the embedded security data may be used to ensure that the user is authorized during installation of the software on the user's machine. In the case of financial or access cards (e.g., debit/credit cards, key cards, corporate badges), the embedded security data may be used to activate the card. In the more general case, the embedded security data may be used to check whether a product is authentic by validating a conspicuous product identifier, such as a visible serial number, with one imperceptibly embedded in the product or its packaging. These systems are detailed further below.

Figure 1:
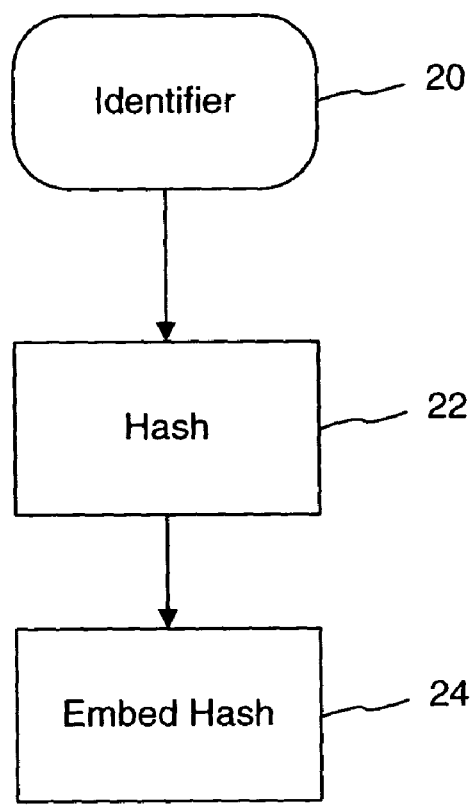
FIG. 1 is a flow diagram illustrating a method for embedding an object identifier into an object.
Figure 2:
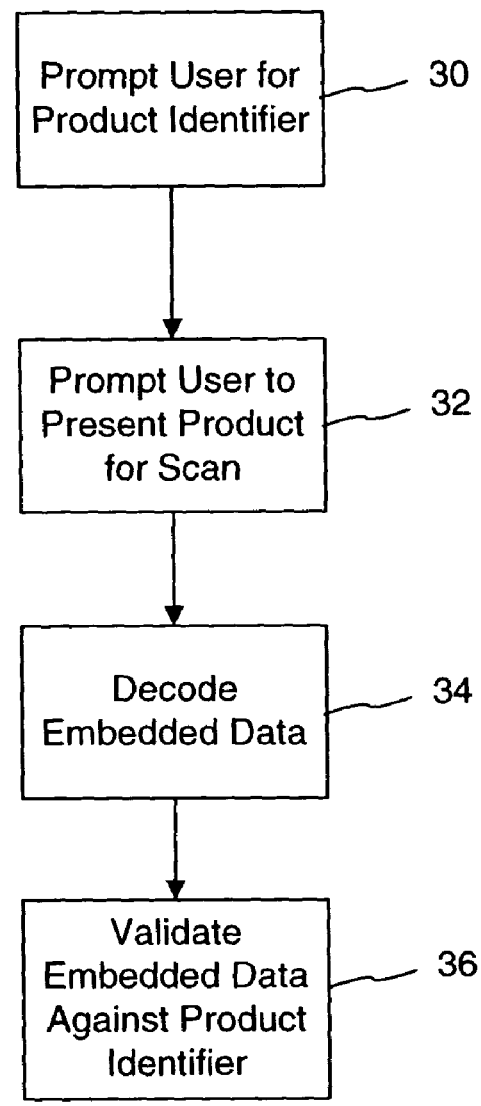
FIG. 2 is a flow diagram illustrating a method for authenticating an object using the embedded object identifier.
Figure 3:
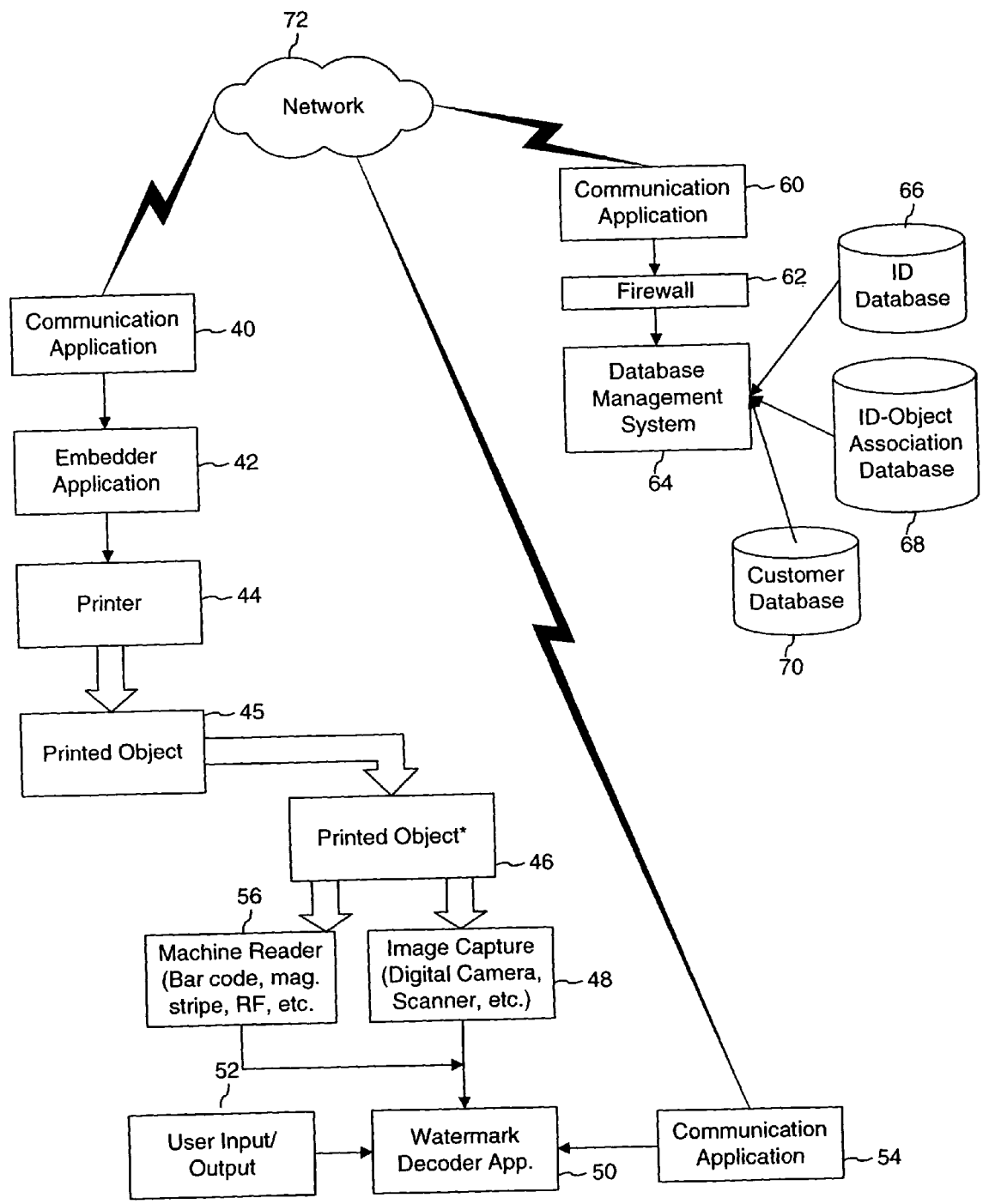
FIG. 3 is a diagram of a system architecture for creating and verifying the authenticity of printed objects using digital watermarks for copy detection and authentication.

Embedding Security Data into a Product (The reference numbers in this section correspond to FIGS. 1-3.).

FIG. 1 is a flow diagram illustrating a method for embedding security data into a product. The maker or distributor of the product assigns a unique identifier, such as a serial number, to the product. The embedding process takes this identifier 20 and transforms it into a form of data for embedding in the product or its packaging. While the identifier need not be modified before embedding it, there are a number of reasons for doing so. One reason is to convert it into a more compact form for embedding. Another reason is to make the embedded data more secure, i.e. more difficult for counterfeiters or pirates to replicate.

FIG. 1 depicts an example of a data conversion method called a hash 22. The hash is a function that converts the identifier into another number. One form of hash is a checksum, but there are many others. One example of a checksum is one that converts a number or set of numbers (e.g., serial number, product code, etc.) into another number using a sequence of prime numbers. A cryptographic hash may be used to generate a new number from which the original identifier is difficult to derive. Whether hashed or not, the data to be embedded is referred to as "security data."

The embedding process embeds the security data into a machine readable code on the product or its packaging (24). In particular, the process steganographically embeds the security data into the machine-readable code on the product or on packaging or labels for the product. A steganographic process embeds information on the product's surface such that is imperceptible or substantially imperceptible upon ordinary inspection, yet readable by machine.

One form of steganography is called digital watermarking. A variety of digital watermarking schemes may be used to embed the watermark onto the print media. Some example watermark encoding and decoding schemes are provided in U.S. Pat. Nos. 5,862,260 and 6,614,914.

In digital watermarking of images printed on physical objects, there is a tradeoff between visual perceptibility and survivability of the watermark. In this application, the watermark is embedded so as to be sufficiently robust to survive analog to digital conversion, digital to analog conversion, and possible other forms of corruption, including geometric distortion, additive noise, and compression. The watermark may be encoded by altering the luminance or one or more other color channels of an image printed on the surface of the product. Alternatively, the watermark may be encoded using clear inks that modulate the microtopology of the product's surface or that are readable when exposed to light in non-visible wavelengths, like UV or infrared. Also, the microtopology of the product surface may be altered in the process of creating the product surface so as to embed a watermark. Alternative machine readable codes may be used as well, such as data glyphs, invisible bar codes, etc.

A digital watermark embedding process typically involves several operations. For example, additional data may be appended to the security data, such as synchronization symbols, error detection codes, etc. After adding this data, the security data includes a sequence of symbols for embedding into the product. Additional operations include error correction and other forms of symbol encoding (e.g., convolution codes, turbo codes, BCH codes, Reed Solomon encoding, M sequences, gold sequences, etc.). These operations transform the original message sequence into a message signal. The message signal may then be further replicated and modulated using spread spectrum modulation techniques. For example, the message signal may be spread over a pseudorandom number or set of pseudorandom numbers and repetitively scattered throughout a host signal.

The host signal (sometimes referred to as the cover signal) is the signal in which the embedded data is hidden. This might be an image printed on an object, label or package, a layer of visible or invisible inks, line art, text, surface topology of an object, etc. The watermark signal may be replicated in several different contiguous or overlapping regions of the host signal. Each instance of the watermark at these regions can be associated with a corresponding imperceptible watermark template, synchronization or orientation signal that enables the decoder to detect the presence of the watermark and determine its orientation parameters such as translation (x, y coordinates of an origin), rotation, scale, shear, differential scale, etc.

To embed the message signal, an embedding function subtly changes the host signal. Digital watermarks usually operate on a digital form of the host signal to create a digital watermarked signal, which is then converted to analog form. However, the digital watermark may also be applied in the analog domain. A variety of embedding functions have been detailed in the literature about digital watermarking. These functions may be additive, multiplicative (adding or multiplying a message signal with the host signal), or some other function, such as a non-linear quantization function. The quantization function embeds a message symbol (e.g., binary or M-ary) by quantizing a sample value or a characteristic of a set of sample values of the host signal to a quantization level associated with the symbol being encoded. To decode the symbol, the watermarked signal is captured and evaluated (e.g., re-quantized) to determine which quantization level a sample or characteristic of a set of samples most closely corresponds to. This quantization level is then mapped to the corresponding symbol.

The embedding functions may be applied to image samples or characteristics in the spatial domain or some transform domain, like Discrete Cosine Transform, Discrete Wavelet Transform, Discrete Fourier Transform, etc.

For enhanced security, various elements of the embedded data may be encrypted. Some or all of the watermark message, including the security data in the message may be encrypted. Various keys used to encode the watermark may be encrypted as well. For example, a key that defines the location of the watermark signal in the host signal may be encrypted. A key used to decode the spread message signal (e.g., a pseudorandom number) may also be encrypted.

In implementations where instances of the watermark signal are repeated in the host signal, a key in the message payload of one instance of a watermark signal may be used to decrypt a message, such as the security data, in other instance of the watermark signal. The key may be included in a message payload by appending the key to the message or combining it with the message using some function such as an XOR, or multiplication operation that combines the key with the message to create a composite message.

Keys used to decode the watermark or its message payload may also be derived from the host signal itself or from another watermark in the host signal.

Digital watermarks provide a low cost, yet secure method of embedding security data into a product or its packaging. The embedding process can be integrated into the process of printing the object or its packaging. For example, for each product, the printing process may be adapted to print an image embedded with the product's identifier or hashed form of it. This process may be integrated in the mass production of a variety of printable objects, like packaging, containers, labels, product documentation, credit cards, etc.

Authenticating a Product Using Embedded Security Data

FIG. 2 is a flow diagram illustrating a process for authenticating a product using embedded security data. The authentication system includes a user interface, scanner and embedded data decoder. In the case where the embedded data is encoded in a digital watermark, the system may be implemented in a personal computer equipped with an imaging device, such as a CCD camera or scanner.

Authentication begins by prompting the user for the product identifier (30). Typically, this identifier is a product serial number in plain view on the product, its packaging or documentation. The user may enter the product number by simply typing it on a keyboard, or using some other user input device (voice recognition, bar code scanner, etc.) In response to receiving the product identifier, the system prompts the user to present the product for scanning (32). The user then scans the product with a sensor device, such as a CCD camera, to capture a product scan.

Next, the system decodes the embedded data from the product scan (34). In the case of security data embedded in digital watermark on the product, the system scans one or more image frames of the product. It then proceeds to detect the watermark in this image signal. Finding a watermark, it decodes the watermark message, including any security data.

To validate the security data (36), the authentication system re-computes the security data from the product identifier entered by the user. It then compares the computed security data with the decoded security data. If the two sets of security data match, then the system deems the product to be valid.

A variety of actions may be triggered by the outcome of the validation process 36. One action is to convey the output of the validation process to the user via a user interface, such as audio output, graphical user interface, etc. This type of operation could be used to authenticate any type of product using an authentication system implemented in a personal computer with an image sensor and software for executing the authentication operations.

In the case of a software product, the validation process (36) can automatically launch installation of the software on the user's computer. A variety of additional post-validation actions may be triggered automatically, such as establishing a connection to another computer (e.g., web server) to facilitate on line registration of the product, downloading of additional software or other content, retrieval of one or more keys that enable the software's operation, etc.

The same actions also apply to other types of products that execute machine instructions from a machine readable memory device. For example, hardware devices with embedded software or firmware could be authenticated in a similar fashion. In particular, the user would enter a product number into a user interface of the device, or another device in communication with it (a nearby PC connected via a wire or wireless port—USB, Firewire, Bluetooth, Infrared link, etc.). The user interface then would prompt the user to scan the product with a camera connected directly to the device being authenticated or indirectly through another device (e.g., the nearby PC). An embedded data decoder would then detect and decode any security data and take actions triggered by the result of the validation process. One action would be to install software to the device being authenticated from a nearby device or computer network. Another action would be to load one or more keys or other instructions that enable functionality of the device being authenticated.

The application of the authentication system to the registration and installation of software and embedded systems may be extended more generally to many forms of digital content, such as software, music, movies, games, etc. In each of these applications, the authentication method and system is similar. The digital content being authenticated may be packaged on a variety of storage media, such as an optical disk, magnetic disk, flash memory card, etc. The storage media or its packaging (e.g., a DVD case) includes embedded security data that is readable by machine and that is validated against a product identifier. The validation process may trigger actions relating to the digital content stored on the storage medium, such as control rendering of the content, control transfer of the content from the storage medium to another device, control usage of the content (e.g., number of copies, transfers, etc. allowed), linking to a network to retrieve related information or actions (e.g., linking to a product web site to get more information, license rights or purchase products or services).

The method depicted in FIG. 2 is also applicable to activation of financial and access cards like credit/debit cards, card keys, corporate badges that include keys for accessing buildings, computer systems (including access to a single machine or access to network resources), etc. To illustrate this application, consider an implementation of the authentication system on a network. First, the user receives a new card along with an identifier. This identifier might be one printed conspicuously on the card or given to the user separately (e.g., such as a corporate personnel number). The user enters this identifier and scans the card with an image sensor (e.g., a PC camera, flatbed scanner, etc.) An embedded data decoding process extracts security data, if any, from the scanned image, and validates it against the data entered by the user. If the embedded data is valid, then the authentication system activates the card.

While the system for activating cards can be implemented on a stand alone computer system, it may be more commonly implemented in a network configuration. The system might be implemented in a client server architecture where a client computer at the user's location performs object scanning and decoding functions, and the server at a remote location validates the embedded data against data supplied by the user. The locations of computer processes that perform the various card activation operations (prompting for user input, scanning, decoding and validation) can be distributed between the client and one or more server computers.

The process of validating a product identifier with embedded security data can be extended in various ways. The embedded data and product identifier entered by the user may be used to form a key to decrypt data supplied in or by the product (e.g., software or multimedia content stored on a CD, DVD, etc.). In this case, the data supplied in or by the product is encrypted and the embedded data is used to convey one element of the key. Other elements of the key may be a product identifier, such as a serial number on the product, and a password of the user. Typically, the data supplied in the product is encrypted by the publisher when the product is made (e.g., burning of a CD, DVD, etc.). However, the encryption and security data embedding processes may be performed whenever data is transferred onto the product (e.g., transfer of data onto a writable storage device).

An additional enhancement is to use the cryptographic key formed from the embedded data and the user entered data (e.g., product identifier, password, etc.) to decrypt yet another key. This additional key can then be used to decrypt content supplied on or by the product. The product may be a storage device such as optical disk, magnetic storage device, flash memory, etc. that carries encrypted data, or some other type of device that supplies encrypted content.

Some examples of such devices are receivers of scrambled content like computers, set-top boxes, personal digital assistants, audio and video players, etc. Consider an example where a user wishes to watch a pay per view movie. The cable provider distributes promotional cards that enable the card holder to access the movie. To access the movie, which is provided in encrypted form via a set-top box or other cable receiver, the user displays the card to a camera connected to the set-top box through a wire or wireless connection. The set-top box decodes embedded security data on the card and combines it with other user and/or product information, such as the user's password, set-top box serial number, card number printed on the card, etc. to form a decryption key that is used to decrypt the movie, which streamed to the set-top box. A similar approach may be applied to other digital content that is downloaded or streamed in an encrypted form over a network, like the Internet, wireless phone network, cable television network, etc.

The security of the embedded data can be enhanced through the use of copy detection technology. Copy detection technology can be used to detect whether a counterfeiter has made a copy of the object bearing the embedded security data. For example, a counterfeiter might try to circumvent the authentication system by making a high quality copy of the image bearing the embedded security data using a scanner or copy machine, and then printing that image on a counterfeit product or its packaging.

The copy detection technology may be used to embed the security data (e.g., a watermark that is used to detect copying and convey security data) or may be separate from the security data (a separate watermark or other auxiliary data that is used to evince copying). One form of copy detection technology is a digital watermark that is altered in a predictable way when copied with a scanner, copy machine, or other imaging device. Such imaging devices apply a transformation to an image (e.g., an analog to digital sampling, color transformation, etc.) that can be detected by a watermark designed to change in a predictable way to such a transformation.

An example of copy detection technology is a "fragile" watermark. The watermark is called fragile because the strength of the watermark signal in a copy of the watermarked original object is less than the strength in the original object. To detect copying, the embedded data decoder attempts to detect the fragile watermark. If the fragile watermark is not present, or has a measured strength that falls below a threshold, then the decoder deems the object to be an invalid copy. There are a variety of ways to measure strength of a watermark signal. One way is to measure the extent of the correlation between an image of the suspect object and a reference fragile watermark signal.

Rather than using a separate fragile watermark, the authentication system may detect copying based on attributes of the watermark used to carry the embedded data. For example, the watermark may include a synchronization or orientation signal used to detect the presence of the watermark and determine its orientation. Copying of a watermarked object may be detected by measuring changes in the watermark orientation signal.

Since the watermark carrying the embedded data is made to survive distortion due to normal scanning operations required to read the watermark from an object, a fragile watermark may not accurately discern copying by a counterfeiter from these normal transformations. However, the watermark payload may be embedded in ways that survive these normal operations, yet still carries information from which copying can be discerned. For example, the payload of the watermark may be robustly encoded to withstand transformations due to scanning, geometric distortion, etc., yet convey information from which copying can be discerned.

One type of copy detection payload is an identifier that is related to some other characteristic of the object (another machine readable code, like a bar code, magnetic stripe, hologram, etc.).

Another form of copy detection is to scramble or encrypt part or all of the watermark payload in a predictable, yet different manner from one product to the next. This may be accomplished using a cryptographic hash that scrambles the payload using the product number or some other product specific attribute as a seed.

Another way is to scramble the location of the watermark or the relationship between different parts of the watermark using a cryptographic function. For example, the watermark may be replicated in blocks of an image, where each block encodes a similar payload, yet encodes that payload in a different manner based on a secret key. Each block may include an orientation signal that enables the decoder to properly align the image data for that block. In each block, the watermark payload may be scrambled differently, such as using a seed for a cryptographic scrambling function based on block location, block number, or data from the payload of another block, etc.

While the decoding process can use the orientation signal to align each block, it may not be able to discern the precise alignment of blocks in the scanned image relative to blocks in the original watermarked image. As such, the decoder may only be able to recover the relative location of blocks to each other, but not their absolute location in the original image. To address this challenge, the variation of the watermark or its payload across the image can be made in a relative manner from one block to the next using a secret key that defines the relationship between blocks. Relative changes between neighboring blocks enable the decoder to extract the payload from one block using information from one or more neighboring blocks. For example, the payload of one block may be altered using the payload of one or more adjacent blocks. The relationship between the payloads of adjacent blocks may be defined according to a cryptographic function. For example, the payload of one block may be used as a key to decoding an adjacent block.

A related enhancement is to use keys for decoding the watermark, the watermark payload, or digital content that are dependent on the host signal. This type of host signal dependent key makes it difficult to copy the embedded security data from one object to another. To illustrate this enhancement, consider embedded security data in an image watermark on a product, packaging, or label. One form of image dependent key is a key that is derived from a property of the image that is insensitive to the changes due to the watermark embedding process and recoverable in a watermark decoding operation on the embedded product.

An example of this type of key is a number that is derived from statistical properties of the image that are insensitive to the watermark embedding process, like the relative power differences between blocks of the image. The key could be, for instance, a binary number computed by comparing the power of a given block with a set of other blocks, such as those in a predetermined neighborhood around the given block. The comparison operations yield a one or zero depending on whether the power of the given block is greater or less than the selected neighbors. Each comparison operation yields a single bit in the key. The key may then be appended or combined with the watermark payload.

At the time of authentication, the watermark decoding process employs a synchronization or orientation signal to align the image data. Then it re-computes the image dependent key by repeating the key derivation operation as computed in the embedding process. The key computed at the time of decoding may be compared with the embedded key to check authenticity of the embedded data. Other properties that are insensitive to the watermark process may be used as well.

Another enhancement that can be used as a form of authentication and copy detection is to embed two or more different watermarks that have a known relationship with respect to each other. One such relationship is a predetermined offset in the spatial image domain, or some other transform domain, like a Discrete Fourier Transform, Discrete Cosine Transform, Discrete Wavelet Transform, or some re-sampling of one of these domains, like a log, log-log, or log-polar re-sampling. This known relationship changes in a predictable way when the watermarked object is copied. Thus, during the authentication process, a watermark decoding process detects the watermarks and computes this relationship between the watermarks. It then compares the computed relationship with the known relationship to determine whether some unauthorized transform likely occurred, such as copying.

One way to detect that a detect whether a printed object (e.g., a document, label, ticket, box) has been copied is to embed two watermark signals with different characteristics that change differently in response to reproduction operations such as photocopying, or digital scanning and re-printing. To differentiate a copy from an original, the watermark decoder measures the characteristics of both watermarks in a digital image scan of the printed object, and detects a copy by the changes in the watermarks attributable to reproduction operations. Examples of this approach are described in U.S. patent application Ser. No. 09/433,104, entitled Methods and Systems Using Multiple Watermarks, by Geoff Rhoads and Ammon Gustafson, which is hereby incorporated by reference. Four approaches are listed in this document, including:

1. high and low spatial resolution watermarks;
2. one watermark with a geometrically linear assignment of pixels and another with a random assignment of pixels;
3. low and high power watermarks; and
4. one watermark with standard a RGB to HSI-HSI to RGB transform and a second watermark that is biased before being transformed from HSI to RGB.

In the first case, the high resolution watermark is degraded more than the low resolution watermark. The watermark detector detects copying by measuring the change in the power ratio between the two watermarks in a suspect image relative to the original ratio, which is set at embedding and provided to the detector. In the other cases, the detector detects copying by observing changes in the relative strengths of the detected watermark signals with respect to the original relationship between the watermarks.

Similar techniques may be used to create a fragile watermark that evidences copying due to changes in the fragile watermark's strength relative to its original strength in the un-manipulated original printed object. Also, the fragile watermarks may be adapted to carry a message payload. Finally, the fragile watermarks may be spatially replicated in contiguous blocks of the image. The detector can then isolate the spatial location of blocks of the image where the fragile watermark or watermarks evidence tampering.

The above sections refer to encryption and decryption operations. A variety of cryptographic technologies may be used to implement these operations. Some examples of encryption technologies include RSA, DES, IDEA (International Data Encryption Algorithm), skipjack, discrete log systems (e.g., El Gamal Cipher), elliptic curve systems, cellular automata, etc.

The above sections also refer to hash operations and in some cases, cryptographic hashes. Cryptographic hashes are functions used to convert a first number into a relatively unique second number in a manner that makes it difficult to derive the first number from the second number. Examples of hashing functions include MD5, MD2, SHA and SHA1.

Watermark Embedding and Decoding System

FIG. 3 is a diagram illustrating an architecture for watermark embedding and decoding for printed objects. As described further below, this architecture applies to a variety of printed object types and application scenarios. Before discussing the various object types and applications, this section begins with a description of the system architecture. The implementer may adapt the system for a particular application using one more components of the architecture. Later sections describe a number of example application scenarios based on this architecture.

There are three primary components to the system: 1. a watermark embedding system (40-44) that embeds a digital watermark into an image and prints the watermarked image on an object 45 (e.g., document, card, label, tag, coupon, ticket, pass, security, certificate of authentication, etc.); 2. a watermark decoding and verification system that reads the watermark from a potentially manipulated version of the printed object 46 and verifies its authenticity (48-56); and a database system (60-70) that performs a variety of functions, depending on the application. These database functions include managing information embedded in the printed objects (e.g., identifiers), managing electronic transactions associated with assigning identifiers and using them in the printed objects, assisting in verification of the printed objects, and maintaining event logs and reports of object usage.

In FIG. 3, these three primary components are interconnected via a network 72 such as the Internet. However, the database functions can be built into the embedder and decoding systems to perform data management and data look up operations locally within those systems.

The embedding and decoding systems are implemented as software applications for an open hardware platform or as special purpose systems. Examples of an open platform implementation include a software application for an operating system like Microsoft Windows or Linux that end-user's install on a computing device with a connection to a network and printer (for embedding) or scanner or digital camera (for decoding and verification). Examples of a special purpose platform include a combined software and hardware system with a network connection (possibly a private network) and a special purpose printer for printing value documents, like boarding passes, tickets, coupons, financial or phone cards, etc. Both the embedding and decoding systems may be implemented in kiosk for public places like coffee shops, restaurants, airports, train stations, bus stations, etc. Such systems can be used for the printing of tickets, passes, coupons, etc., as well as in check in stations for tickets and passes or redemption stations for coupons.

Implemented as a software program or a combination of hardware and software, the embedder application 42 takes an image for printing on an object and embeds a digital watermark in the image comprising an array of sample values (halftone dots or multilevel per pixel samples). Preferably, the digital watermark is substantially imperceptible to a viewer of the image, but that is not a requirement in all applications. The embedder embeds a message payload into blocks of pixels of an image. Depending on the size of the image and the payload, the message payload may be replicated throughout the image several times to increase robustness. In certain applications, the embedder embeds an identifier into the message payload that is uniquely associated with a printed object or set of similar printed objects. This identifier may be used to identify the object, to link the printed object with information about it stored in a local or remote database, to act as a unit of value or link to a monetary value associated with the object (e.g., a ticket, a piece of postage, a pass, a coupon, etc.), to authenticate the object, to track the usage of the printed object (e.g., to monitor usage of a train or bus pass, to monitor redemption of coupons), etc.

The embedder may also embed into the watermark payload attributes of the image printed on the object, such as a perceptual hash of the image. In addition, it may embed attributes of the bearer of the object such as name, user ID number, age, etc. or other information into the watermark message payload. Also, it may embed text data that is printed on the object (like a document ID, etc.) into the watermark payload. In each case, the embedder may embed text or numeric data representing the attributes themselves, a hash of this data, or a losslessly compressed version of this data.

Additionally, the watermark payload may include a time stamp or a link to a time stamp in the database. This time stamp is useful in verification operations to check the age of the printed object, and process the object according to its age. In some applications, like passes, tickets, debit cards, etc. the printed object becomes invalid and inoperable after a certain period elapses.

For verification, the decoding system derives these attributes from the printed object and compares them with the information in the watermark payload or in the database, which is referenced by the identifier in the watermark payload. A verification module performs the process of verifying authentication attributes derived from the object and elsewhere (e.g., from the database, from the user, etc.). This module may be located in the decoding system, a remote database, or distributed in both systems.

The watermark protocol defines the nature of the watermark signal and its payload. For example, the protocol specifies keys used to encode and decode the watermark, symbol coding schemes like error correction coding, M sequences and gold sequences, error detection schemes (convolution codes, Reed Solomon codes, BCH codes, etc.), spread spectrum modulation and associated spreading keys, synchronization codes, etc. The protocol may vary from one application to the next. The protocol may define a single robust watermark, a single fragile watermark, or some combination of fragile and robust watermarks. For example, the object may have a single fragile watermark (per image block). This fragile watermark may carry a payload, or simply act as a copy detection watermark that degrades when the printed object is reproduced in a photocopy machine or by scanning and reprinting. The object may have a single robust watermark (per image block) that carries a message payload. Alternatively, the object may include a robust watermark for carrying a message payload, and a fragile watermark that acts as a copy detection watermark. The robust and fragile watermarks may each be implemented as two or more different watermark signals. Also, the watermark signals may include attributes, such as a template, calibration signal or other characteristic features or patterns that are used to correct for geometric distortion in capturing an image of the object for watermark decoding. In some applications, it is useful to ascertain which portions of the object have been tampered with. One way to do this is to repeat a fragile watermark in spatial blocks of the image printed on the object. Then, in the decoding process, a watermark detector indicates which blocks have a detectable fragile watermark and which do not. Another approach is to embed a fragile watermark with a different message payload in each block. Then, in the decoding process the detector reports all of the fragile watermark payloads that it has successfully recovered. The missing payloads indicate the blocks that have been tampered with.

After embedding the watermark in the image, the embedder passes the watermarked image to the printer 44, which in turn, prints the image on an object to create the printed object 45. The watermark survives the transformation from a digital image to a physical printed object, and is typically spread over surface of the object (e.g., repeated in contiguous rectangular blocks throughout the object), which may carry other information, such as the host image in which the watermark is embedded as well as other markings and text. This object undergoes typical or malicious manipulation, such as wear and tear, soiling, crumpling, photocopying, scanning and reprinting, etc. To depict this manipulation, FIG. 3 graphically depicts the printed object 45 being transformed into a potentially altered version of the object 46 after manipulation.

The watermark decoding system includes an image capture device 48, watermark decoder application 50, and user input/output devices (like a keyboard, display, etc.). It may also include a machine reader 56 to read other machine readable codes from the object (2D or 1D bar code, a magnetic stripe, an RF tag, an integrated circuit chip carrying data about the object, organic transistor, etc.). The information conveyed in these other machine readable codes may be related to the information conveyed in the watermark payload (e.g., through a predetermined mathematical relationship such as one being the hash of the other) for authenticating the printed object.

The watermark decoder employs watermark detecting and reading technology described and referenced in this document to detect a fragile watermark if present, and to read the watermark payload if present. For more on watermark embedding, detecting and reading operations, see U.S. Pat. No. 5,862,260 and U.S. application Ser. No. 09/503,881, which are incorporated by reference. Depending on the implementation, the watermark decoder may perform one or more verification processes such as: checking for the presence of a fragile watermark or watermarks, measuring the strength of the watermark signal, or comparing the payload information with other verification information entered by the user, read automatically from other machine readable features on the document, printed on the face of the document or fetched from a database, etc. The decoder may also communicate watermark payload information to the database, or use the watermark payload information to look up additional authentication information in the database via a network connection.

The watermark detection and/or payload reading of one or more watermarks in the image may be based on user provided key information, such as a password, which may be combined with an image hash or other information on the object to provide a watermark detection key (e.g., a pseudorandom pattern) or a watermark payload descrambling or decoding key.

As detailed further below, the watermark may also link the printed object to a database entry storing information about the user. The decoding system or database compares the user information in the database entry with that supplied by the user to verify that the printed object is being presented for verification by the proper user. This feature is useful to verify that certain types of items, like tickets, boarding passes, legal documents, etc. are not only authentic but also are being presented by the appropriate person. This user specific information is associated with the identifier embedded in the printed object by the embedding system, which communicates the association between the ID and the specific user to the database at the time of embedding.

As shown in FIG. 3, both the embedding and decoding systems may take advantage of a database for a variety of functions. This database may be local or remote as shown in FIG. 3. The embedding and decoding systems shown in FIG. 3 include a communication application (40, 54, respectively). This application enables the systems to communicate with the database system via a network. For the typical implementation adapted for computer networks like the Internet, this communication application represents network communication software and network interface hardware to connect computers on a network. For example, the communication application implements a TCP/IP protocol, and uses standard communication technologies like SSL, HTTP, and XML to pass information. The specific connections can be made over a public or private network, WAN, or LAN. Both the embedding and decoding system can be designed to be portable or fixed at one location, either with a connection to the network that is always on or that is established on demand.

The database in FIG. 3 communicates with the embedding and decoding systems via a compatible communication application 60. For example, an application adapted for the internet uses standard Internet communication protocols, and if security is desired, a secure connection like SSL. As shown, the database may also communicate with the other remote systems through a firewall that restricts communication to messages from authenticated machines and/or users. To authenticate a machine, the firewall only allows message packets from machines with a particular machine address (e.g., a particular set or class of IP addresses). To authenticate individual users of the embedding and decoding systems, the firewall requires the user to enter the appropriate password and log-in information. For some applications, the database may be public, in which case, these security measures are not necessary.

Behind the firewall, a database management system 64 manages requests for embedding transactions and verification transactions. For certain applications, it maintains an ID database 66 of identifiers (IDs). These identifiers are embedded in the watermark payload of printed objects and used to link back to a database entry for verification or other functions (like linking to a web page or e-commerce transaction, etc.).

The embedding system gets IDs for embedding either in blocks or on demand from the ID database via the database management system. The embedding system, for example, may request a block of IDs for later embedding into watermarked images to be printed on objects. Alternatively, the embedding system may request IDs as needed in a real time connection with the database. In some applications, the database management system implements an electronic transaction to charge a customer's account for each ID or block of IDs that have been requested or registered with that customer. The transaction is associated with the customer via a secure transaction involving customer authentication via a password, and machine authentication via a particular machine address or signature supplied by the embedding computer or printer.

The database entry may include information to verify the authenticity of the printed object, such as features of the document that can be compared with the document to check for authenticity (such as a document number, a machine readable code on the document, a hash of text on the document, a hash of perceptual image features of the document image, etc.). The database may also include information to verify the authenticity of the bearer of the printed objects, such as a special user password or user ID, a picture of the user, or other biometric data of the user (hand writing signature, iris or retinal scan, fingerprint, voice signature, key stroke signature, etc.). This information is captured from the user or embedding system at the time of embedding and added to another database called the ID-Object association database 68.

In particular, the embedding application records the IDs along with the related object and/or user authentication information at the time that the IDs are embedded into the printed objects. If the embedder application maintains a real-time connection with the database, it transfers the ID along with the associated authentication information back to the database management system 64, which in turn, creates a database record in the ID-object association database 68. The embedder application may also implement a store and forward approach, where it records the ID-authentication information associations, and forwards them to the database when a connection is available.

The embedding system may also associate additional information with printed objects. For example, the customer may want to associate a particular web site address with a printed object so that the printed object is dynamically linked to the web site by the decoding application in conjunction with a look up operation in the ID object association database. For example, in one application for sports tickets, the bearer of the ticket shows the ticked to a web camera connected to a computer enabled with watermark decoding software. The watermark decoder application transmits the ID extracted from the watermarked image on the ticket to the database management system, which in turn, looks up the web site address in the ID-object association database 68 indexed by the ID number. The database management system then returns the web site address to the user's computer, which launches a web browser and fetches the web page at the supplied web address.

For some applications, the database management system is configured to have a public and private side. The public side is used to link watermarked objects to related information, by returning the related information just like the web address in the previous paragraph. The private side is used for authentication operations, such as checking whether a printed object is authentic, checking whether the bearer of the printed object is valid, etc.

In addition to linking to authentication information, the identifiers may also serve the function of representing units of value associated with the printed object. For example, the printed object may be a pass for a bus, train, ski lift, etc. At embedding, the embedding system associates the number of units of value to be associated with the printed object, and charges the buyer's account (electronically debits the buyer's account by the units of value associated with the printed object). At the decoding side, the decoder application 50 extracts an embedded identifier from the watermark in the image on the object, and connects to the database to determine the amount of value associated with the identifier in the database. The database management system decrements the number of units remaining for the object with each use of the watermarked object. When the number of units remaining drops to zero, the database management system sends back a control signal indicating that the watermarked object is no longer valid.

One variation to this approach is to program the database management system to return control signals to the decoding system for display to the user. In this variation, the control signals warn the user that the number of units remaining has dropped below a threshold, and offer the user the opportunity to buy more units via a secure electronic transaction over the network, such as a credit card transaction. When the user buys more units and refreshes the object in this manner, the database management system increments the number of units associated with the printed object.

The database further includes a customer database 70 to maintain customer account information, such as customer passwords for user authentication and financial transaction information associated with the purchase of identifiers associated with embedding transactions.

In some system designs, the design requirements dictate that the database management system act as a router to other secure databases controlled by different entities. For example, a number of different customers may wish to maintain their own authentication databases, and databases for controlling use of the printed objects under their control. In this case, the database management system 64 uses one or more layers of indirection to link the customer's database to the decoder application 50. In particular, the ID-object association database 68 stores a relationship between an ID and a customer system (e.g., the network address of the computer system controlled by the customer). For authentication or other actions triggered by the ID in the watermark, the database management system 64 looks up the customer's computer address in the database 68 using the ID from the watermark, and either forwards the ID to the customer's database system using the computer address of that system, or returns the customer address information to the decoding system, which in turn establishes a secure connection with the customer database. In the first case, the database management system also forwards a computer address of the decoding system to the customer database (e.g., the IP address) so that it can respond directly to the decoder application 50 running in the decoding system.

Using this approach, the database management system can act as a router to send transaction requests to many different customer databases in response to decoding a watermark payload. Some objects may even be associated with more than one customer. For example, when a user presents a ticket for verification, the decoding system sends the ID extracted from the watermark to the database management system 64, which in turn, forwards it to the ticketing agent's computer for authentication. The database management system may also link the decoding system to another party's computer, such as the ticket promoter's web site for more information (e.g., promotional information, information about the ticket, electronic commerce opportunities to buy more tickets or related products or services, etc.)

As noted previously, the decoding system does not require a connection to a local or remote authentication database to authenticate the printed object. In some cases, the object can be authenticated by checking the strength or for the presence of a fragile watermark signal. Also, the watermark payload can be designed to carry authentication information like a hash of the watermarked image on the object. To authenticate the image, the hash is decoded from the watermark and compared with a new hash computed of the image of the object (optionally realigned to correct for geometric distortion relative to the orientation, scale and position of the image data when the embedded hash was computed). The sensitivity of the hash to changes can be tuned to detect modifications due to photocopying, scanning, or re-printing. Preferably, the hash is computed of features of the image, such as energy or power at selected spatial frequencies or certain color attributes that degrade predictably in response to photocopying or printing operations. Such an image hash may allow benign image editing like brightness or contrast changes, but detects content additions or deletions to the image. Geometric distortion introduced by copying may also be detected by observing aspect ratio changes of certain visible or hidden fiducials printed in the image.

Another form of authentication is to use certain image features, text content on the printed object, or information provided by the user (such as password, user ID, or other user specific information) as a key to create a watermark pattern (e.g., as a key to a PN number generator that is used to create a noise image that is adapted to the image and added to it). At authentication time, the information used to create the key is obtained from the object, the user, the authentication database, or a combination of these sources. The decoding system then creates the watermark signal from the key, and if the watermark is present, the printed object is authentic. If it is not present, the printed object is deemed not authentic.

Example Applications

The following sections describe how the system may be adapted for a variety of types of printed objects. In each of these cases, copy detection technology, such as fragile watermarks, authentication hashes embedded in the watermark, or special authentication keys used to create the watermark may be used to authenticate the printed object. In addition, the watermark may carry information that is used to access and index information in a database or on a computer network as described above.

Stocks and Bonds

The system shown in FIG. 3 can be used to create print stock certificates and bonds with copy detection watermarks to verify their authenticity. In addition, decoding systems can use the identifier embedded into the watermarks on the documents to link to the database, where information for authenticating the document and/or its owner are stored. As title changes, the database can be updated to associated the current owner and other transaction information with the identifier embedded in the document. Also, the database management system can keep a log of when, where, and by whom the document is presented for authentication and generate detailed reports providing such transaction information.

Visas and Passports

The system can be used to implement similar functions for visas and passports. In particular, the database can be used to store information about the bearer of the visa or passport, such as a photo, unique user identifier or other information. In the verification process, the decoder extracts the information from the watermark and compares it with authentication information elsewhere in the document or in the database. If the information does not match, then the passport or its bearer are not valid.

For database applications, the passport may be linked to a unique database entry via an identifier embedded in the watermark. For example, border control personnel can compare a photo returned from the database with the person bearing the document to authenticate the bearer of the passport.

Legal Documents

The system can be used to verify and manage legal documents, such as contracts, deeds, title, etc. In addition to providing an authentication function, the watermark can link to a database for additional information about the document in the database via the identifier in the watermark payload. This information may include contact information for the parties of the contract, version control information to indicate whether the contract is the most current and valid document in a series of related documents, information for authenticating that a contract document has been fully executed by all parties, etc.

Insurance Policy

The system can be used for similar functions for insurance policies. In addition, important text information, such as the nature of the insured property, can be stored in a secure database that can be accessed via the identifier embedded in the watermark. If the watermark is unreadable, the insurance policy has been tampered with and is not authentic. If the watermark is readable, but the content on the document has been changed, then the text information in the secure database can be checked by indexing it using the identifier in the watermark payload. This text can then be matched with the text on the document to verify its accuracy. Alternatively, a hash of the text can be embedded in the watermark payload, and compared with a hash of the text on the document to give the document another self authenticating feature.

Purchase Orders, Purchase Requisitions, Invoices, Bills

The system can be used to authenticate purchase orders, purchase requisition and invoices. In addition, the watermark payload can index information about the purchase order/requisition or invoice in the system's database. The database can provide a variety of information, including financial information regarding the status of the transaction that is dynamically updated as the document is processed. The database returns information for display, such as the transaction status: pending, fulfilled, shipped, shipping date, paid, balance overdue, goods returned, etc. The decoding stations can be used to update the status in the database by sending status updates to it as the document is processed.

Bank Statements, Credit Card Statements

The system provides an effective way to authenticate bank and credit card statements. In addition, the identifier extracted from the watermark on the statement links to personal financial records, account information, etc. stored in the database. This enables the user to show the statement to a digital camera or scanner in a decoding system, and link automatically to related financial records, and account status information. Special user information provided by the user or embedded in the watermark can be used to generate an access code to get access to the database records.

Transportation Tickets

The system can be used to print and authenticate a variety of transportation passes and tickets, such as a single use and multiuse bus or train ticket, an airline ticket and airline boarding pass. The copy detection watermark, in these applications, is used to authenticate the pass. In addition, the watermark payload may be used to authenticate the user as well. For example, the user enters a code at a check-in or verification terminal. This terminal then compares the code with information in the watermark payload, or information linked to the pass via the watermark on the pass. If the user information entered by the user matches the authentication information on the card or in the database linked by the watermark, then the terminal deems the user to be valid. The user information in the watermark payload or database may be related to the information supplied by the user via a cryptographic function such as a cryptographic hash.

In addition, the pass may be associated with some number of passes or rides via the identifier embedded in the watermark. Each time the pass is used, the watermark is decoded and the corresponding number of passes linked to the object via the watermark is decremented. The identifier in the watermark links the object to a database that stores information about the object, including the number of passes available.

Event Tickets

The system can be used to authenticate event tickets and the users of those tickets as described above. In addition, the watermark can be used to link to additional information about the event that is general or specific to the particular ticket. For example in one application, the database returns images showing how to get to the seat and what the view is from the seat of the event.

Birth Certificates

The system can be used to authenticate birth certificates, as well as link to records in a database relating to the birth certificate, such as when and where the certificate was issued, and procedures for ordering additional copies, etc.

Diploma

The system can be used to authenticate diplomas and other similar items like a certificate of mastery from a class, professional licenses (contractor, doctor, lawyer), etc. In addition, the system can be used to authenticate the bearer of the document to verify that the person presenting the document is its valid owner.

Permits

The system can be used to authenticate permit documents like building permits and inspection permits. In addition, the watermark may also carry an identifier that links the permit to a records database for more information about the project to which the permit relates.

Timesheets

The system can be used to authenticate time sheets and link to an accounting database for related information about a particular project to which the timesheet relates.

Personal Cards

The system may be used to create and verify a variety of types of personal cards, like voter registration cards, library cards, phone cards, financial cards, insurance cards, photo IDs, and other membership cards (health club, etc.). The decoding system can also be used to control access to certain places or things. For example, the system could verify a voter card as well as the voter at a voting booth. In addition, the system maybe used to keep a record of the vote to prevent the voter from voting more than once.

The watermark on the library card could also be used to link the user to a database of book check in/check out transactions and provide information about when items are due.

Product Labels

As detailed above, the system can be used in product security applications to authenticate clothing and merchandise labels, tags, certificates of authenticity, etc. In addition, the watermark can include an identifier that links to a database entry or web site that has product information, warranty information, user instructions, options to purchase related items and accessories, etc.

Using watermarks for product security and links to information applies to product packaging and the products themselves. It can be used on a variety of products, including music CDs, software CDs (both the cover and the physical item), VHS cassettes (both the sleeve and label), DVD ROM (both the cover and the physical item), certificates of authenticity for software, tags for popular items for trading, like Beanie Babies toys, or other merchandise, etc.

Forensic Photographs

Fragile digital watermarks can be used to check whether a digital image has been tampered with. However, such applications may not extend to cases where such photographs are printed and kept in a physical file. The system described above can be used to embed authentication watermarks in such images before they are printed. The authentication watermark can be used to authenticate the printed image and also link to a database where a pristine digital copy of the image is stored securely. This applies to prints of insurance photos taken digitally, prints of evidentiary photos (crime scene, etc.), and a variety of other applications.

Improving Robustness to Attack

In some watermark applications, watermarks may be subject to various types of attacks. These attacks may include attempting to remove the watermark, attempting to copy it from one electronic signal or object to another, and attempting to forge a watermark in a signal or physical object. These types of attacks may be more likely to occur in security and copy protection applications. In these applications, the watermark may be used to convey rights (e.g., the right to copy or record) or authenticate an electronic or physical object (such as an electronic object like a video, audio or image file, or a tangible object such as a document, identification card, ticket, etc.).

The following sections describe several countermeasures to attacks. These countermeasures are particularly directed to attacks where the watermark is forged or copied into an electronic or physical object (object should be construed to cover an electronic and physical object, unless stated otherwise). In the case of a copy attack, the attacker attempts to estimate a watermark signal in an object expected to have a valid watermark. The attacker than inserts an estimate of the watermark signal in another object. Forging a watermark refers to unauthorized creating and embedding a watermark signal into an object. While the countermeasures discussed below are particularly useful in addressing these types of attacks, the generally improve the robustness of a watermark in many applications and help counter other types of attacks.

Content and User Dependent Watermarks

One way to make the watermark more robust against malicious attack is to make the watermark signal dependent on some attribute of the object into which it is to be embedded. For instance, the watermark key that specifies how or where the watermark is inserted in the object can be make dependent on the object carrying the watermark. This approach makes it difficult to copy or forge the watermark in another object without having the original object or knowing the attribute of the host that the watermark is dependent on. The watermark key may be dependent on some attribute or attributes of the media signal in which the watermark is to be embedded, such as the pixel values of an image or the audio sample values of an audio signal.

Alternatively, it may be dependent on some attribute that is uniquely assigned to the object. For example, the object may be assigned with an identifier that is uniquely associated with the owner or user of the object, such as the owner of a watermarked identification card. This identifier, being uniquely associated with a particular owner, may be used to generate a watermark key. If the watermark is copied or forged into an object used by another person, then that person will not be able to provide a watermark key that enables a successful decode of the watermark.

One way to implement a user dependent key is to use a person's name (or other unique attribute of that person) to create a watermark key. The key may be necessary to decode a scrambled watermark message, or to locate the message in the watermarked object. The key may specify the temporal or spatial location of the watermark. It may specify the transform coefficients (e.g., frequency domain coefficients) where the object has been altered to encode the watermark.

The name or other attribute of the person may be converted to a watermark key using a predetermined function. Alternatively, the name or other attribute may be used to look up a watermark key from a database (e.g., user's name or unique identifier number is linked to a specific watermark key to be used to extract a watermark from the watermarked object). If the watermark decoder is unable to read the watermark using the key derived in this manner, then it indicates that the person is not the valid owner or user of the watermarked object. This approach is particularly suited for checking the validity of a photographic identification document that has been watermarked using a user dependent key.

Another approach to make the watermark more robust is to embed a watermark that is content dependent so that is difficult to forge or copy from another object. Content dependent refers to a watermark signal that is dependent on a host signal into which it is embedded. One way to make the watermark content dependent is to transform at least a portion of the host signal to a transform coefficients in a selected transform domain, and then alter one or more of the coefficients so that they correspond to a value of a desired symbol. The symbol is selected from a predetermined symbol alphabet in each symbol has one or more values associated with it. The transform coefficients are modified so that they have a value corresponding to the desired symbol to be encoded. The value to which the transform coefficients are modified is picked based on the desired symbol to be encoded and the value associated with that symbol that requires the smallest change to the host signal. This approach is a form of non-linear watermark encoding.

One example of the approach in the previous paragraph for image objects is to perform a wavelet decomposition of at least a portion of the image into subbands. The pattern of coefficients in one or more of the subbands is altered to correspond to a pattern associated with a symbol to be encoded. This process may be repeated to encode several symbols. In the decoder, the same wavelet decomposition is computed for the watermarked image and the resulting patterns compared with the patterns in the symbol alphabet. For each pattern, the symbol with the closest matching pattern is determined to be the one that has been encoded. A similar approach can be performed on other media types such as audio and video, using a wavelet transform or other types of transforms like an FFT, DCT, etc.

One particular technique for adapting the watermark signal to a host image signal in which it is embedded is to replace the magnitude (phase is left in tact) of one set of Fourier coefficients, $S_1 = (C_1, C_2, \ldots C_n)$, by an amount:

$(Avg_1 + delta_1, Avg_2 + delta_2, \ldots Avg_n + delta_n)$, and adjust a corresponding set of Fourier coefficients:
$S_1' = (C_1', C_2', \ldots, C_n')$ by an amount $(Avg_1 - delta_1, Avg_2 - delta_2, \ldots Avg_n - delta_n)$.

Where $Avg_1 = (C_1 + C_1')/2$, $Avg_2 = (C_2 + C_2')/2$, and $Avg_n = (C_n + C_n')/2$.

The array of delta values can be any secret pattern, such as a pseudorandom number generated by seeding a pseudorandom number generator with a secret key seed number. The key seed number itself may be derived from features of the host signal. In fact, the mathematical relationship between the coefficients in one set and the corresponding coefficients in another set may be any of a variety of mathematical relationships. Changes to different coefficients in the set may be made according to different mathematical relationships. For example, the amount of change (e.g., delta in this example) may vary as a linear or non-linear relationship of the frequency. Further, the approach may be repeated on additional sets of coefficients $S_2, S_3, \ldots S_n$. Each set may use the same or different key for the delta pattern. Different types of messages and authentication data may be encoded by applying the method to certain ones of the sets of coefficients, and by varying the delta patterns per each set of coefficients to correspond to desired message symbols to be encoded.

Figure 10:
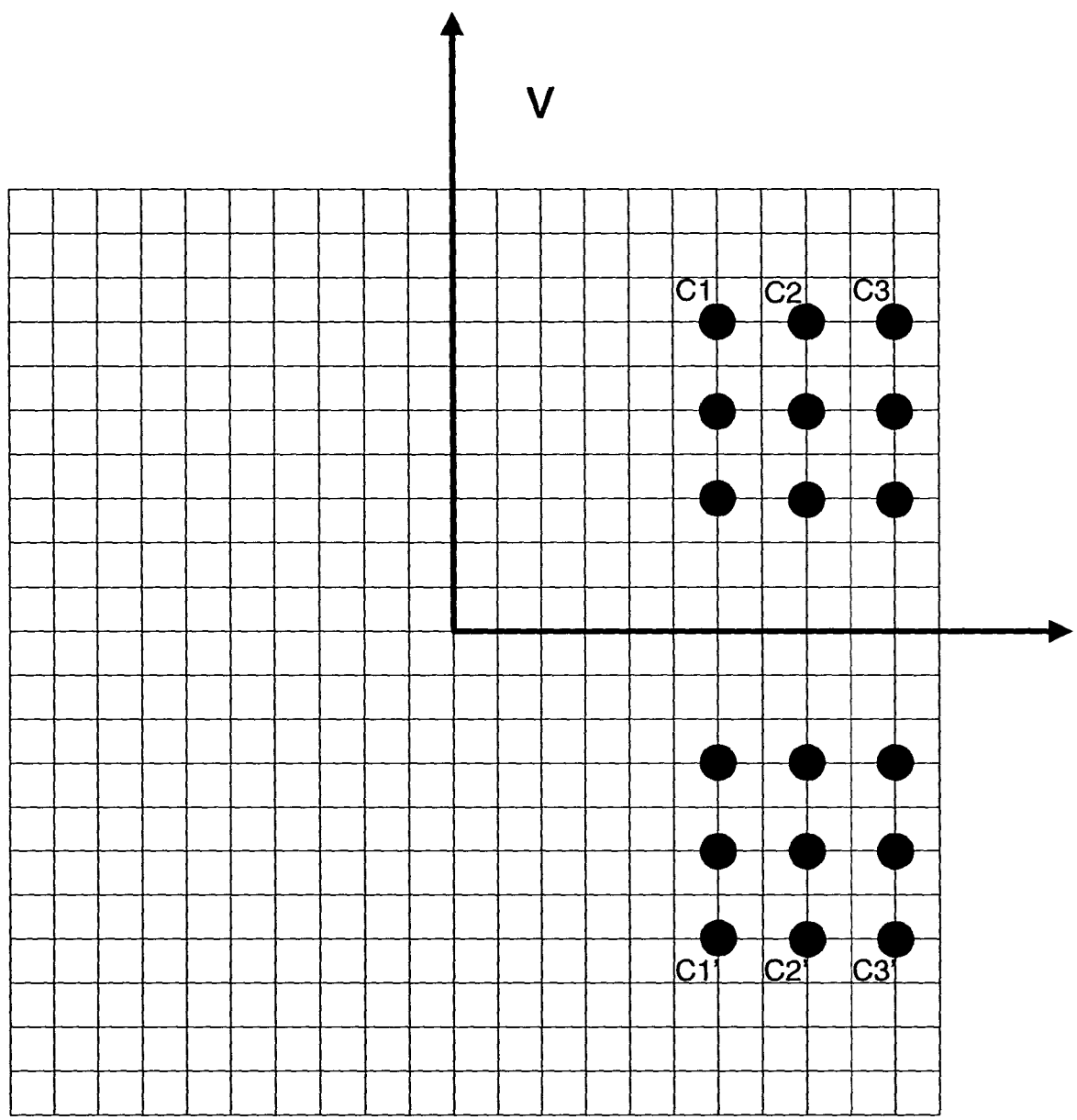
FIG. 10 is a diagram illustrating aspects of a watermark embedding process where sets of frequency coefficients are adjusted so that the sets have a predetermined relationship.

In one implementation, the coefficients in sets $S_1$ and $S_1'$ are selected as shown in FIG. 10. Each coefficient in set $S_1$ is in a first quadrant of the Fourier transform domain of the host image, while corresponding coefficients in set $S_1'$ are in a second quadrant. If these two quadrants were folded together along a line separating the two quadrants, the corresponding coefficients in $S_1$ and $S_1'$ would overlap.

After completing the watermark embedding process, the difference between the corresponding sets of coefficients is a known pattern, $(2delta_1, 2delta_2, \ldots 2delta_n)$.

At the detection stage, the detector computes the difference between at least a subset of the corresponding sets of coefficients, possibly after re-aligning the data to compensate for geometric distortion of the captured image relative to the image at the time of watermark embedding. The differences are then correlated with the intended pattern ($delta_1$, $delta_2, \ldots delta_n$). If the correlation coefficient is less than a threshold, the captured image is deemed not to be authentic (e.g., a forgery or counterfeit).

By making the watermark content dependent using a non-linear encoding scheme, it is more difficult for the watermark attacker to forge or copy the watermark from a different object without detailed knowledge of the encoding process. Even if the encoding process is deduced in whole or in part, the watermark message may be scrambled so that copying or forging the watermark will be ineffective. For example, the watermark message may be scrambled in a manner that is dependent on the name of the valid owner of the object. Alternatively, the watermark message may be scrambled in a manner that is dependent on the signal content in which the watermark is embedded.

Yet another approach is to use content specific attributes of a watermark derived at the time of encoding to authenticate the watermark in the decoding process. After the encoder has completed encoding a watermark into an object, it analyzes the watermarked object and derives a characteristic or set of characteristics that describe attributes of it. This attribute can be a characteristic signal manifested in a transform domain or in the native domain of the watermarked signal. For example, the attribute may be the location or location of frequency coefficients that have signal energy above a given level. It may be an identifier of a color and a corresponding range of watermark signal strength in that color. For an image object, this characteristic may be measured by printing the watermarked image, scanning the image back to a digital domain, and then computing the characteristic. Next, the characteristic is stored in a database entry that is referenced via a database index in the watermark message. At decoding time, the characteristic is re-computed by scanning the watermarked image. The characteristic computed at decoding time is then matched with the characteristic stored in the database to determine whether it is sufficiently close to the stored characteristic. If so, it is deemed valid; otherwise, it is rejected.

Post Processing to Reject Invalid Watermarks

Another way to counter watermark attacks is to use additional watermark screening stages to reject invalid watermarks. Since it is likely that forged or copied watermarks are likely to be encoded with less strength or at least differently than through the use of a valid watermark encoder, the watermark detector may use this weakness of the forged or copied watermark to reject it. The above sections described a technique for detecting watermarks in multiple stages. At different stages of detection, the detector computes detection values to assess whether a portion of a host signal is likely to contain a valid watermark. If these detection values do not surpass predetermined thresholds, the watermark may be rejected as being invalid.

Preferably, the watermark screening strategy is implemented in two or more stages, with each stage being more discriminating in rejected signals. In particular, as the detector proceeds through each stage, the candidate signals need to have detection values that surpass more stringent rejection tests (e.g., higher thresholds). Thus, even if a forged or copied watermark passes an initial stage, it is increasingly more likely that it will get rejected in subsequent stages. Since the watermark forger or copier does not have detailed knowledge of the detector, he cannot be sure whether the forged or copied watermark will ultimately pass the rejection tests.

Embedding Multiple Watermark Signals

Another way to counter attacks is to embed two or more different watermark signals. Each of the watermarks may be encoded with a different signal strength. The decoder can then determine whether the watermark is valid by measuring the strength of the different watermarks. If a watermark component is not detected, or its detected signal strength falls below a desired threshold, the decoder rejects it as an invalid watermark.

Anther variation of this approach is to encode watermarks at different frequencies (e.g., at high and low frequencies). One of the watermarks e.g., the one at the high frequency is less likely to survive through an attack. As such, the absence of this watermark at the decoding process indicates that the watermark is not valid. The watermark encoding may be implemented by using watermark carrier signals at different frequencies or by encoding the different watermark components at different frequency coefficients.

Using Content Dependent Watermark Messages

Another way to counter attacks is to encode a content specific message into the watermark. At encoding time, a content specific message is derived from the host signal into which the watermark message is to be embedded. It is then included as at least part of the message that is encoded into the watermark. At decoding, the decoder derives the content specific message from the signal suspected of containing a valid watermark. It then decodes the watermark and compares the content specific message extracted from the watermark with the content specific message derived from the suspect signal. If the two are not within a predetermined tolerance of each other, then the decoder deems the watermark to be invalid.

The content specific message may be computed in several ways. It should be relatively insensitive to routine processing of the watermarked signal. For images, the content specific message should remain substantially unchanged through D to A and A to D conversion, compression/decompression, noise addition and small geometric transformations. An image hash may be used as the content specific message, but it needs to be relatively insensitive to typical manipulation of the watermarked image. One form of semi-sensitive hash is a low pass filter of the image or a portion of it. The low pass filtered image can then be hashed into a number that is inserted into the message. An example of a low pass filter is to use the most significant bits of at least a selected part of the image.

Another content dependent message is a message derived based on salient features in the content. For photographic images on identification documents, the salient features may be the location of the eyes, nose or mouth in the photo of the document holder, or the relative location of these features. This location data (e.g., coordinates or hash of the coordinates) can be converted into a numeric message, which is encoded into the watermark embedded in the photographic image. If the watermark is forged or copied into another image, then the content specific message in the watermark is unlikely to be within predetermined tolerances of the content specific message computed from the image.

Identification Documents

Identification documents can be enhanced by using digital watermarks. This section describes processing of the ID document on the issuing and inspection sides to combat counterfeiting and forgery.

ID Document Issuing Side

On the issuing side, a watermark encoder embeds a digital watermark in a digital photo (or other image to be placed on the ID document). The watermark carries a piece of multi-bit identifying data. This data can optionally link to data on the card.

Preferably, the embedding process is tuned for survival through printing and scanning. A detailed description of such a process is provided above.

The watermark encoder also embeds in a second version of the digital photo the same piece of identifying data. The second image may be compressed with a technique such as JPEG still image compression, or optionally down-sampled to reduce storage requirements. The processes of down-sampling and compression may be used together or singly. The embedding process in the second image may be less tuned to maintain image quality and more tuned to survive manipulation such as image compression, down-sampling, or other transformation that it will undergo.

The first image is printed on the identification document (e.g., ID card) using personalized printing methods that could range from ink-jet printing to laser engraving.

The second image is encoded on the identification document in some portable storage media device or machine readable code such as a magnetic stripe, a 2D barcode, transistor, RF tag, magnetic ink, etc.

Alternatively, it is encoded in a database accessible to ID document inspection systems. In such case, the ID document is linked to the second image via an identifier that serves as a database key to a database entry storing the second image. The inspection system may be equipped with the database as well as a database manager for retrieving images via their respective keys. Alternatively, it may access the database through a wire or wireless connection using standard network communication protocols (e.g., via a network connection, which may include a wire and/or wireless connection). The identifier may be embedded in the ID document in a watermark or some other storage device or machine readable code, such as the examples listed above.

ID Document Inspection Side

At inspection, a watermark decoder recovers data encoded in the watermark from the printed image. Suitable implementations of a watermark decoder for detecting and reading a watermark from an image captured from a document are described above.

The second version of the image is retrieved from the storage device or machine readable code on the ID document or from remote storage, and decompressed (if necessary). Next, the watermark decoder recovers the watermark from this second image.

The pair of embedded identifiers in the first and second images provide a machine-readable link between the two images (e.g., the photo on the document, and the second version encoded in the document or stored elsewhere). The images themselves provide a human viewable confirmation that the image on the identification document has not been tampered with.

As an additional layer of security, the embedded data in the first and second images may be a piece of personal information, such as a number uniquely associated with the valid bearer of the ID document. This enables the ID document system to create a verification triangle between the bearer and the two images, as well as the one image to the other.

A possible variation is to store different but related identifiers in the two images. One example is the start and end of the document number. Together, these related identifiers get compared to a corresponding identifier on the ID document to check validity of the ID document. To validate the ID document, the inspection device needs to recover the embedded data from the image printed on the document and the second image.

Another variation is to use some function f( ) where f(document number) yields some fairly unique x,y pair of numbers. The number x is encoded in a watermark in the printed image and the number y is encoded in a watermark in the image (encoded into the document or stored in a database). By employing a cryptographic function to generate the unique number pair, it is possible to combat the threat of a counterfeiter lifting a watermark from the document and successfully reproducing it on a substitute photo.

Some examples of cipher algorithms for implementing a cryptographic function that generates a pair of numbers include RSA, DES, IDEA (International Data Encryption Algorithm), skipjack, discrete log systems (e.g., El Gamal Cipher), elliptic curve systems, cellular automata, etc.

The watermark may be used to detect block-level alterations in the printed image. In particular, the watermark may be replicated in a similar fashion in blocks of the image to be printed on the ID, and the image kept separately (either encoded in the document or stored in a database). By comparing the watermark extracted from corresponding blocks in both images, the inspection device can detect alterations to the printed image.

Plastic Credit and Debit Card Systems Based on the Principles of the Invention (The reference numbers in this section correspond to FIGS. 4-9)

Growth in the use of plastic credit cards, and more recently debit cards and ATM cash cards, needs little introduction. Nor does there need to be much discussion here about the long history of fraud and illicit uses of these financial instruments. The development of the credit card hologram, and its subsequent forgery development, nicely serves as a historic example of the give and take of plastic card security measures and fraudulent countermeasures. This section will concern itself with how the principles of this invention can be realized in an alternative, highly fraud-proof yet cost effective plastic card-based financial network.

A basic list of desired features for an ubiquitous plastic economy might be as follows: 1) A given plastic financial card is completely impossible to forge; 2) An attempted forged card (a "look-alike") cannot even function within a transaction setting; 3) Intercepted electronic transactions by a would-be thief would not in any way be useful or re-useable; 4) In the event of physical theft of an actual valid card, there are still formidable obstacles to a thief using that card; and 5) The overall economic cost of implementation of the financial card network is equal to or less than that of the current international credit card networks, i.e., the fully loaded cost per transaction is equal to or less than the current norm, allowing for higher profit margins to the implementors of the networks. Apart from item 5, which would require a detailed analysis of the engineering and social issues involved with an all out implementation strategy, the following use of the principles of this invention may well achieve the above list, even item 5.

Figure 8:
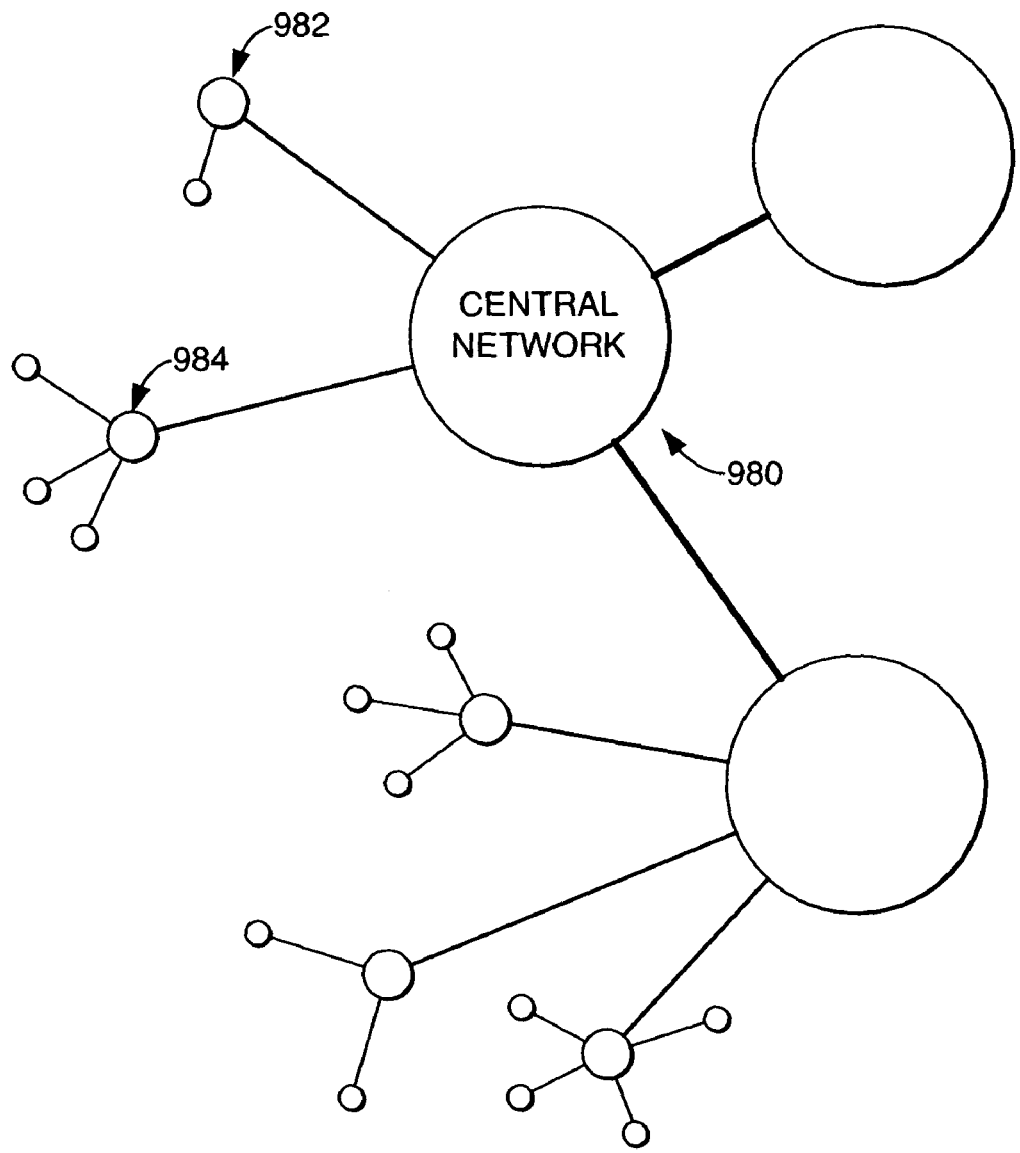
Figure 9:
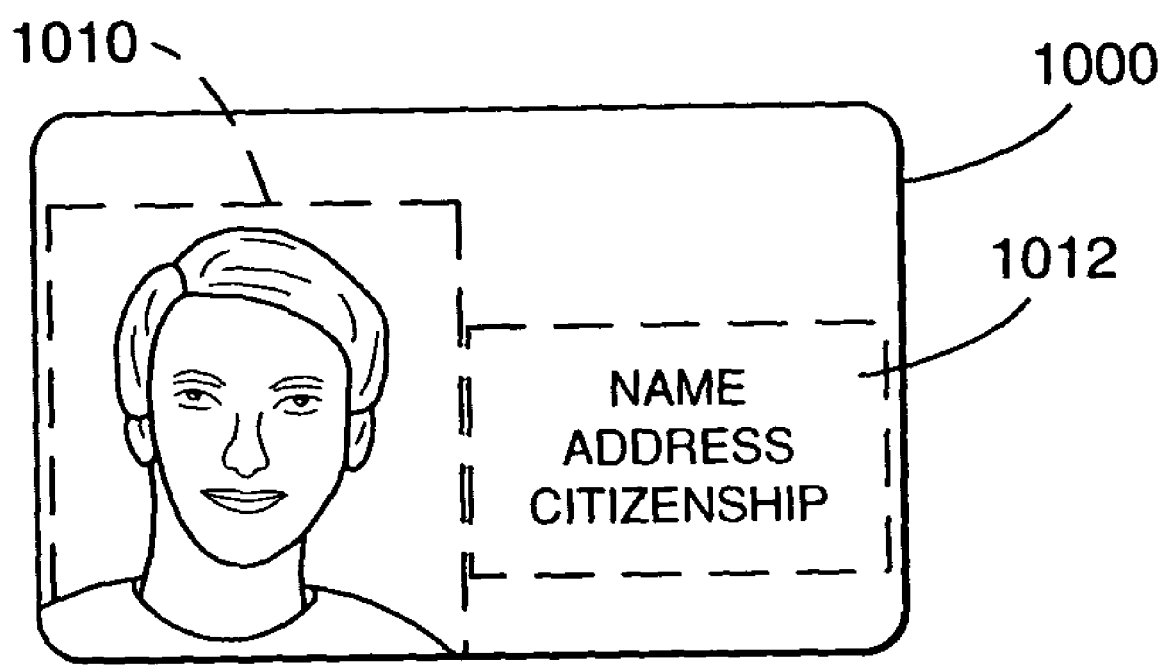
FIG. 9 is a diagram of a photographic identification document or security card with which a security system aspect of the present invention may be applied.

FIGS. 4 through 8, along with the ensuing written material, collectively outline what is referred to in FIG. 8 as "The Negligible-Fraud Cash Card System." The reason that the fraud-prevention aspects of the system are highlighted in the title is that fraud, and the concomitant lost revenue therefrom, is apparently a central problem in today's plastic card based economies. The differential advantages and disadvantages of this system relative to current systems will be discussed after a preferred embodiment is presented.

Figure 4:
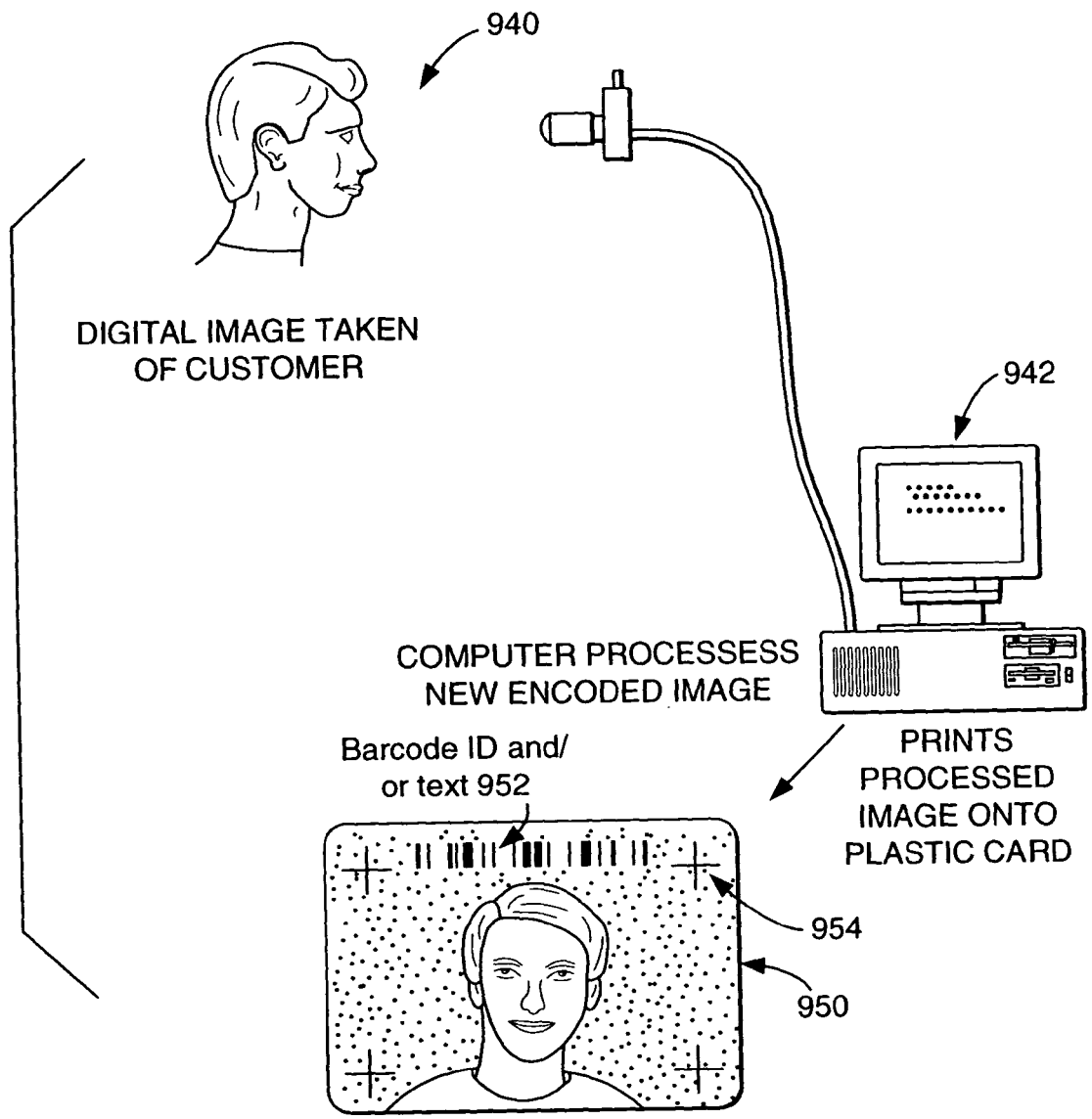

FIG. 4 illustrates the basic unforgeable plastic card which is quite unique to each and every user. A digital image 940 is taken of the user of the card. A computer, which is hooked into the central accounting network, 980, depicted in FIG. 8, receives the digital image 940, and after processing it (as will be described surrounding FIG. 6) produces a final rendered image which is then printed out onto the personal cash card 950. Also depicted in FIG. 4 is a straightforward identification marking, in this case a bar code 952, and optional position fiducials which may assist in simplifying the scanning tolerances on the Reader 958 depicted in FIG. 5.

The short story is that the personal cash card 950 actually contains a very large amount of information unique to that particular card. There are no magnetic strips involved, though the same principles can certainly be applied to magnetic strips, such as an implanted magnetic noise signal (see earlier discussion on the "fingerprinting" of magnetic strips in credit cards; here, the fingerprinting would be prominent and pro-active as opposed to passive). In any event, the unique information within the image on the personal cash card 950 is stored along with the basic account information in a central accounting network, 980, FIG. 8. The basis for unbreakable security is that during transactions, the central network need only query a small fraction of the total information contained on the card, and never needs to query the same precise information on any two transactions. Hundreds if not thousands or even tens of thousands of unique and secure "transaction tokens" are contained within a single personal cash card. Would-be pirates who went so far as to pick off transmissions of either encrypted or even unencrypted transactions would find the information useless thereafter. This is in marked distinction to systems which have a single complex and complete "key" (generally encrypted) which needs to be accessed, in its entirety, over and over again. The personal cash card on the other hand contains thousands of separate and secure keys which can be used once, within milliseconds of time, then forever thrown away (as it were). The central network 980 keeps track of the keys and knows which have been used and which haven't.

Figure 5:
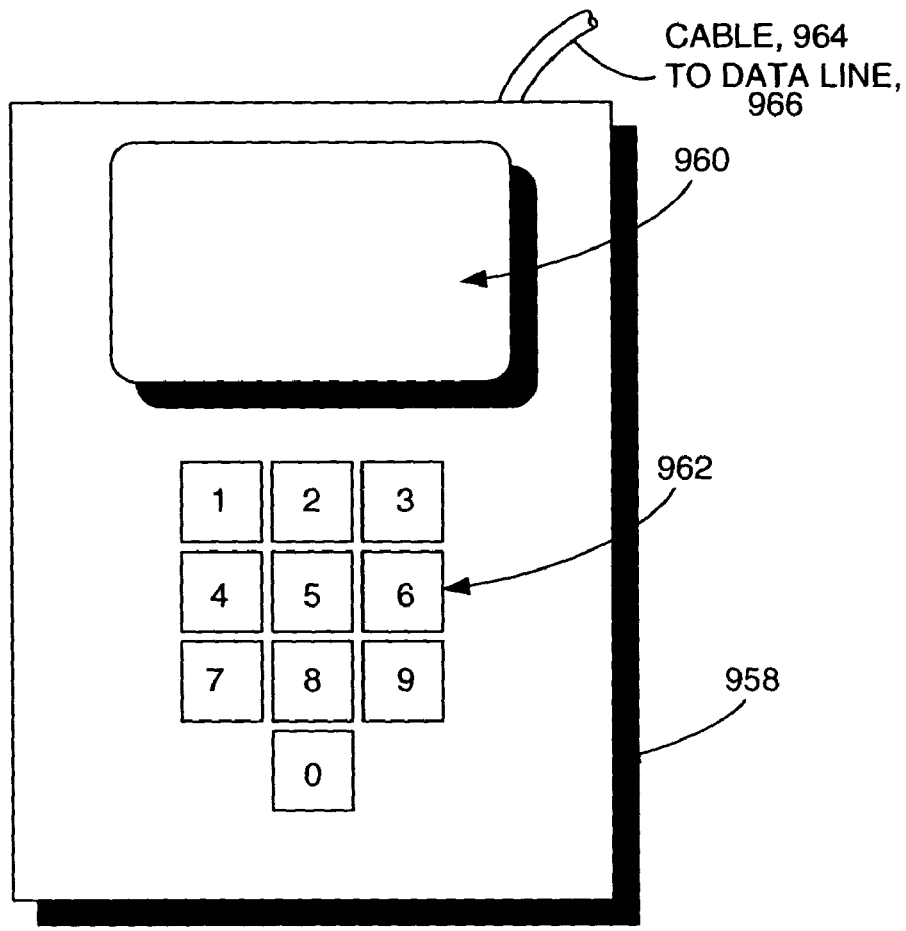

FIG. 5 depicts what a typical point-of-sale reading device, 958, might look like. Clearly, such a device would need to be manufacturable at costs well in line with, or cheaper than, current cash register systems, ATM systems, and credit card swipers. Not depicted in FIG. 5 are the innards of the optical scanning, image processing, and data communications components, which would simply follow normal engineering design methods carrying out the functions that are to be described henceforth and are well within the capability of artisans in these fields. The reader 958 has a numeric punch pad 962 on it, showing that a normal personal identification number system can be combined with the overall design of this system adding one more conventional layer of security (generally after a theft of the physical card has occurred). It should also be pointed out that the use of the picture of the user is another strong (and increasingly common) security feature intended to thwart after-theft and illicit use. Functional elements such as the optical window, 960, are shown, mimicking the shape of the card, doubling as a centering mechanism for the scanning. Also shown is the data line cable 966 presumably connected either to a proprietor's central merchant computer system or possibly directly to the central network 980. Such a reader may also be attached directly to a cash register which performs the usual tallying of purchased items. Perhaps overkill on security would be the construction of the reader, 958, as a type of Faraday cage such that no electronic signals, such as the raw scan of the card, can emanate from the unit. The reader 958 does need to contain, preferably, digital signal processing units which will assist in swiftly calculating the dot product operations described henceforth. It also should contain local read-only memory which stores a multitude of spatial patterns (the orthogonal patterns) which will be utilized in the "recognition" steps outlined in FIG. 7 and its discussion. As related in FIG. 5, a consumer using the plastic card merely places their card on the window to pay for a transaction. A user could choose for themselves if they want to use a PIN number or not. Approval of the purchase would presumably happen within seconds, provided that the signal processing steps of FIG. 7 are properly implemented with effectively parallel digital processing hardware.

Figure 6:
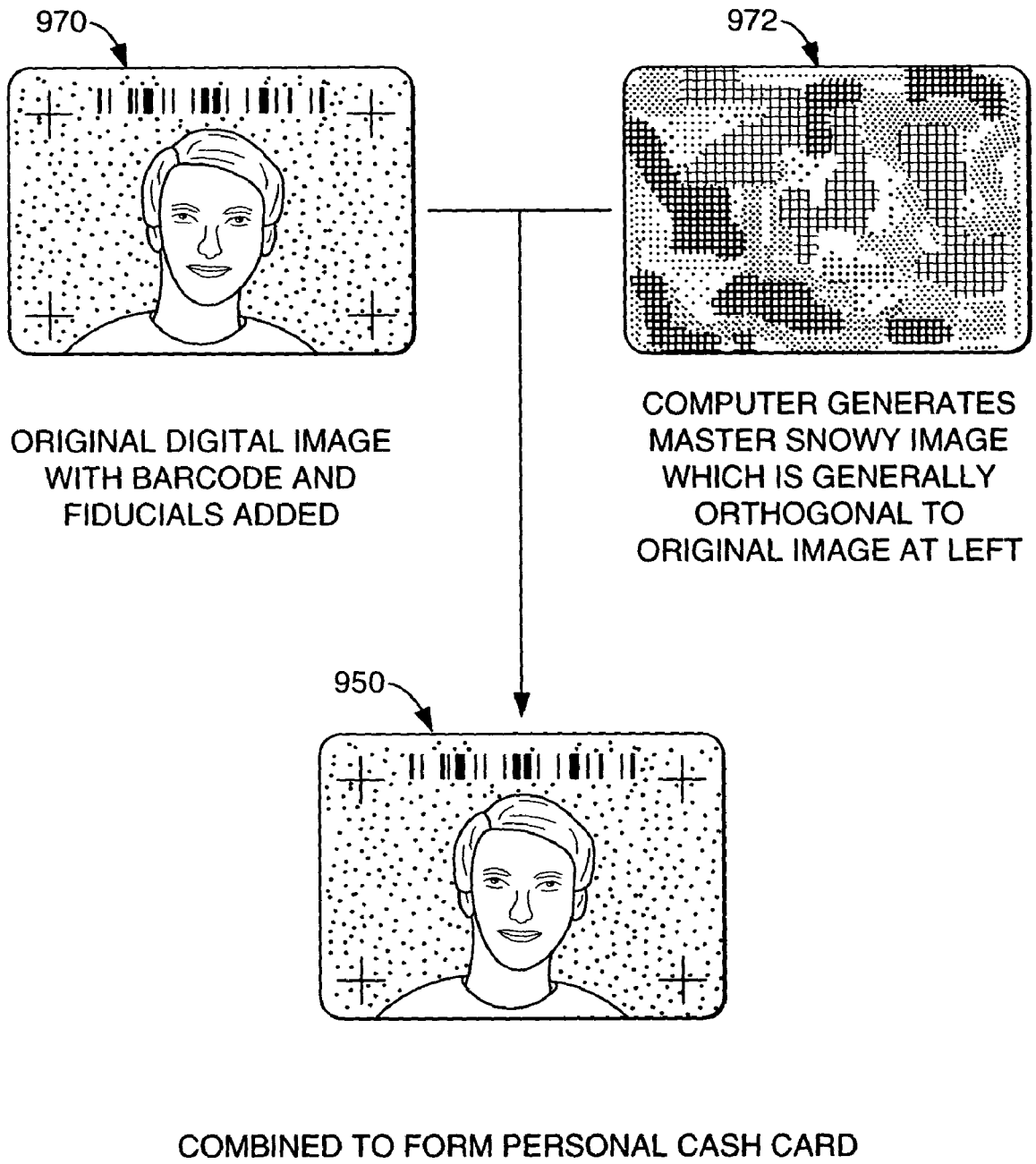

FIG. 6 takes a brief look at one way to process the raw digital image, 940, of a user into an image with more useful information content and uniqueness. It should be clearly pointed out that the raw digital image itself could in fact be used in the following methods, but that placing in additional orthogonal patterns into the image can significantly increase the overall system. (Orthogonal means that, if a given pattern is multiplied by another orthogonal pattern, the resulting number is zero, where "multiplication of patterns" is meant in the sense of vector dot products; these are all familiar terms and concepts in the art of digital image processing). FIG. 6 shows that the computer 942 can, after interrogating the raw image 970, generate a master snowy image 972 which can be added to the raw image 970 to produce a yet-more unique image which is the image that is printed onto the actual personal cash card, 950. The overall effect on the image is to "texturize" the image. In the case of a cash card, invisibility of the master snowy pattern is not as much of a requirement as with commercial imagery, and one of the only criteria for keeping the master snowy image somewhat lighter is to not obscure the image of the user. The central network, 980, stores the final processed image in the record of the account of the user, and it is this unique and securely kept image which is the carrier of the highly secure "throw-away transaction keys." This image will therefore be "made available" to all duly connected point-of-sale locations in the overall network. As will be seen, none of the point-of-sale locations ever has knowledge of this image, they merely answer queries from the central network.

FIG. 7 steps through a typical transaction sequence. The figure is laid out via indentations, where the first column has steps performed by the point-of-sale reading device 958, the second column has information transmission steps communicated over the data line 966, and the third column has steps taken by the central network 980 which has the secured information about the user's account and the user's unique personal cash card 950. Though there is some parallelism possible in the implementation of the steps, as is normally practiced in the engineering implementation of such systems, the steps are nevertheless laid out according to a general linear sequence of events.

Step one of FIG. 7 is the standard "scanning" of a personal cash card 950 within the optical window 960. This can be performed using linear optical sensors which scan the window, or via a two dimensional optical detector array such as a CCD. The resulting scan is digitized into a grey scale image and stored in an image frame memory buffer such as a "framegrabber," as is now common in the designs of optical imaging systems. Once the card is scanned, a first image processing step would probably be locating the four fiducial center points, 954, and using these four points to guide all further image processing operations (i.e. the four fiducials "register" the corresponding patterns and barcodes on the personal cash card). Next, the barcode ID number would be extracted using common barcode reading image processing methods. Generally, the user's account number would be determined in this step.

Step two of FIG. 7 is the optional typing in of the PIN number. Presumably most users would opt to have this feature, except those users who have a hard time remembering such things and who are convinced that no one will ever steal their cash card.

Step three of FIG. 7 entails connecting through a data line to the central accounting network and doing the usual communications handshaking as is common in modem-based communications systems. The preferred embodiment of this system would obviate the need for standard phone lines, such as the use of optical fiber data links, but for now we can assume it is a garden variety belltone phone line and that the reader 958 hasn't forgotten the phone number of the central network.

After basic communications are established, step four shows that the point-of-sale location transmits the ID number found in step 1, along with probably an encrypted version of the PIN number (for added security, such as using the ever more ubiquitous RSA encryption methods), and appends the basic information on the merchant who operates the point-of-sale reader 958, and the amount of the requested transaction in monetary units.

Step five has the central network reading the ID number, routing the information accordingly to the actual memory location of that user's account, thereafter verifying the PIN number and checking that the account balance is sufficient to cover the transaction. Along the way, the central network also accesses the merchant's account, checks that it is valid, and readies it for an anticipated credit.

Step six begins with the assumption that step five passed all counts. If step five didn't, the exit step of sending a NOT OK back to the merchant is not depicted. So, if everything checks out, the central network generates twenty four sets of sixteen numbers, where all numbers are mutually exclusive, and in general, there will be a large but quite definitely finite range of numbers to choose from. FIG. 7 posits the range being 64K or 65536 numbers. It can be any practical number, actually. Thus, set one of the twenty four sets might have the numbers 23199, 54142, 11007, 2854, 61932, 32879, 38128, 48107, 65192, 522, 55723, 27833, 19284, 39970, 19307, and 41090, for example. The next set would be similarly random, but the numbers of set one would be off limits now, and so on through the twenty four sets. Thus, the central network would send (16×24×2 bytes) of numbers or 768 bytes. The actual amount of numbers can be determined by engineering optimization of security versus transmission speed issues. These random numbers are actually indexes to a set of 64K universally a priori defined orthogonal patterns which are well known to both the central network and are permanently stored in memory in all of the point-of-sale readers. As will be seen, a would-be thief's knowledge of these patterns is of no use.

Step seven then transmits the basic "OK to proceed" message to the reader, 958, and also sends the 24 sets of 16 random index numbers.

Step eight has the reader receiving and storing all these numbers. Then the reader, using its local microprocessor and custom designed high speed digital signal processing circuitry, steps through all twenty four sets of numbers with the intention of deriving 24 distinct floating point numbers which it will send back to the central network as a "one time key" against which the central network will check the veracity of the card's image. The reader does this by first adding together the sixteen patterns indexed by the sixteen random numbers of a given set, and then performing a common dot product operation between the resulting composite pattern and the scanned image of the card. The dot product generates a single number (which for simplicity we can call a floating point number). The reader steps through all twenty four sets in like fashion, generating a unique string of twenty four floating point numbers.

Step nine then has the reader transmitting these results back to the central network.

Step ten then has the central network performing a check on these returned twenty four numbers, presumably doing its own exact same calculations on the stored image of the card that the central network has in its own memory. The numbers sent by the reader can be "normalized," meaning that the highest absolute value of the collective twenty four dot products can divided by itself (its unsigned value), so that brightness scale issues are removed. The resulting match between the returned values and the central network's calculated values will either be well within given tolerances if the card is valid, and way off if the card is a phony or if the card is a crude reproduction.

Step eleven then has the central network sending word whether or not the transaction was OK, and letting the customer know that they can go home with their purchased goods.

Step twelve then explicitly shows how the merchant's account is credited with the transaction amount.

As already stated, the primary advantage of this plastic card invention is to significantly reduce fraud, which apparently is a large cost to current systems. This system reduces the possibility of fraud only to those cases where the physical card is either stolen or very carefully copied. In both of these cases, there still remains the PIN security and the user picture security (a known higher security than low wage clerks analyzing signatures). Attempts to copy the card must be performed through "temporary theft" of the card, and require photo-quality copying devices, not simple magnetic card swipers. The system is founded upon a modern 24 hour highly linked data network. Illicit monitoring of transactions does the monitoring party no use whether the transmissions are encrypted or not.

It will be appreciated that the foregoing approach to increasing the security of transactions involving credit and debit card systems is readily extended to any photograph-based identification system. Moreover, the principles of the present invention may be applied to detect alteration of photo ID documents, and to generally enhance the confidence and security of such systems. In this regard, reference is made to FIG. 9, which depicts a photo-ID card or document 1000 which may be, for example, a passport or visa, driver's license, credit card, government employee identification, or a private industry identification badge. For convenience, such photograph-based identification documents will be collectively referred to as photo ID documents.

The photo ID document includes a photograph 1010 that is attached to the document 1000. Printed, human-readable information 1012 is incorporated in the document 1000, adjacent to the photograph 1010. Machine readable information, such as that known as "bar code" may also be included adjacent to the photograph.

Generally, the photo ID document is constructed so that tampering with the document (for example, swapping the original photograph with another) should cause noticeable damage to the card. Nevertheless, skilled forgers are able to either alter existing documents or manufacture fraudulent photo ID documents in a manner that is extremely difficult to detect.

As noted above, the present invention enhances the security associated with the use of photo ID documents by supplementing the photographic image with encoded information (which information may or may not be visually perceptible), thereby facilitating the correlation of the photographic image with other information concerning the person, such as the printed information 1012 appearing on the document 1000.

In one embodiment of this aspect of the invention, the photograph 1010 may be produced from a raw digital image to which is added a master snowy image as described above in connection with FIGS. 4-6. The above-described central network and point-of-sale reading device (which device, in the present embodiment, may be considered as a point-of-entry or point-of-security photo ID reading device), would essentially carry out the same processing as described with that embodiment, including the central network generation of unique numbers to serve as indices to a set of defined orthogonal patterns, the associated dot product operation carried out by the reader, and the comparison with a similar operation carried out by the central network. If the numbers generated from the dot product operation carried out by the reader and the central network match, in this embodiment, the network sends the OK to the reader, indicating a legitimate or unaltered photo ID document.

In another embodiment of this aspect of the invention, the photograph component 1010 of the identification document 1000 may be digitized and processed so that the photographic image that is incorporated into the photo ID document 1000 corresponds to the "distributable signal" as defined above. In this instance, therefore, the photograph includes a composite, embedded code signal, imperceptible to a viewer, but carrying an N-bit identification code. It will be appreciated that the identification code can be extracted from the photo using any of the decoding techniques described above, and employing either universal or custom codes, depending upon the level of security sought.

It will be appreciated that the information encoded into the photograph may correlate to, or be redundant with, the readable information 1012 appearing on the document. Accordingly, such a document could be authenticated by placing the photo ID document on a scanning system, such as would be available at a passport or visa control point. The local computer, which may be provided with the universal code for extracting the identification information, displays the extracted information on the local computer screen so that the operator is able to confirm the correlation between the encoded information and the readable information 1012 carried on the document.

It will be appreciated that the information encoded with the photograph need not necessarily correlate with other information on an identification document. For example, the scanning system may need only to confirm the existence of the identification code so that the user may be provided with a "go" or "no go" indication of whether the photograph has been tampered with. It will also be appreciated that the local computer, using an encrypted digital communications line, could send a packet of information to a central verification facility, which thereafter returns an encrypted "go" or "no go" indication.

In another embodiment of the present invention, it is contemplated that the identification code embedded in the photograph may be a robust digital image of biometric data, such as a fingerprint of the card bearer, which image, after scanning and display, may be employed for comparison with the actual fingerprint of the bearer in very high security access points where on-the-spot fingerprint recognition systems (or retinal scans, etc.) are employed.

It will be appreciated that the information embedded in the photograph need not be visually hidden or steganographically embedded. For example, the photograph incorporated into the identification card may be a composite of an image of the individual and one-, or two-dimensional bar codes. The bar code information would be subject to conventional optical scanning techniques (including internal cross checks) so that the information derived from the code may be compared, for example, to the information printed on the identification document.

It is also contemplated that the photographs of ID documents currently in use may be processed so that information correlated to the individual whose image appears in the photograph may be embedded. In this regard, the reader's attention is directed to the description in parent publication no. US 2003-0002710 A1, which is herein incorporated by reference, entitled "Use in Printing, Paper, Documents, Plastic-Coated Identification Cards, and Other Material Where Global Embedded Codes Can Be Imprinted," wherein there is described numerous approaches to modulation of physical media that may be treated as "signals" amenable to application of the present invention principles.

Figure 12:
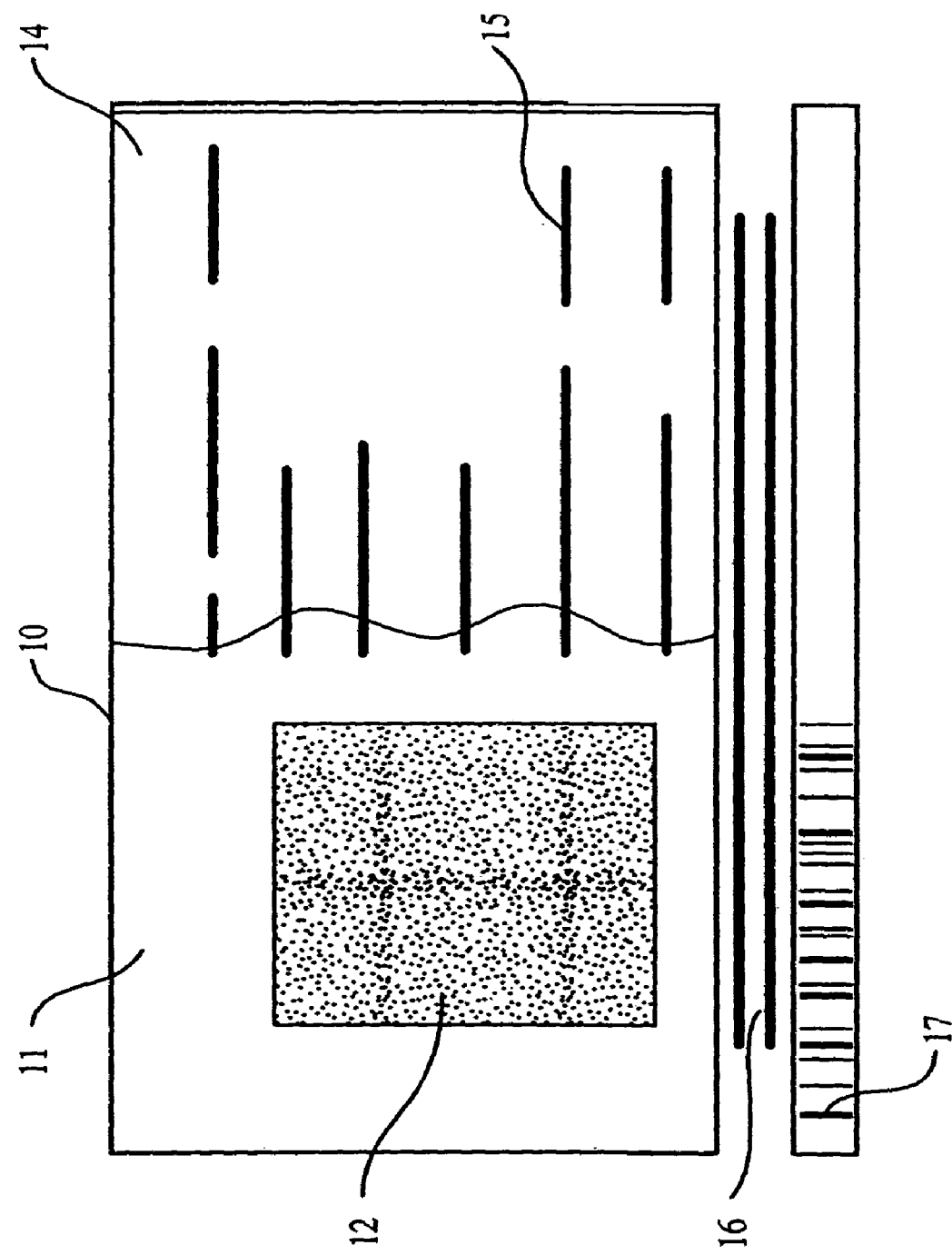
FIG. 12 illustrates a security document in accordance with one aspect of the present invention.
Figure 13:
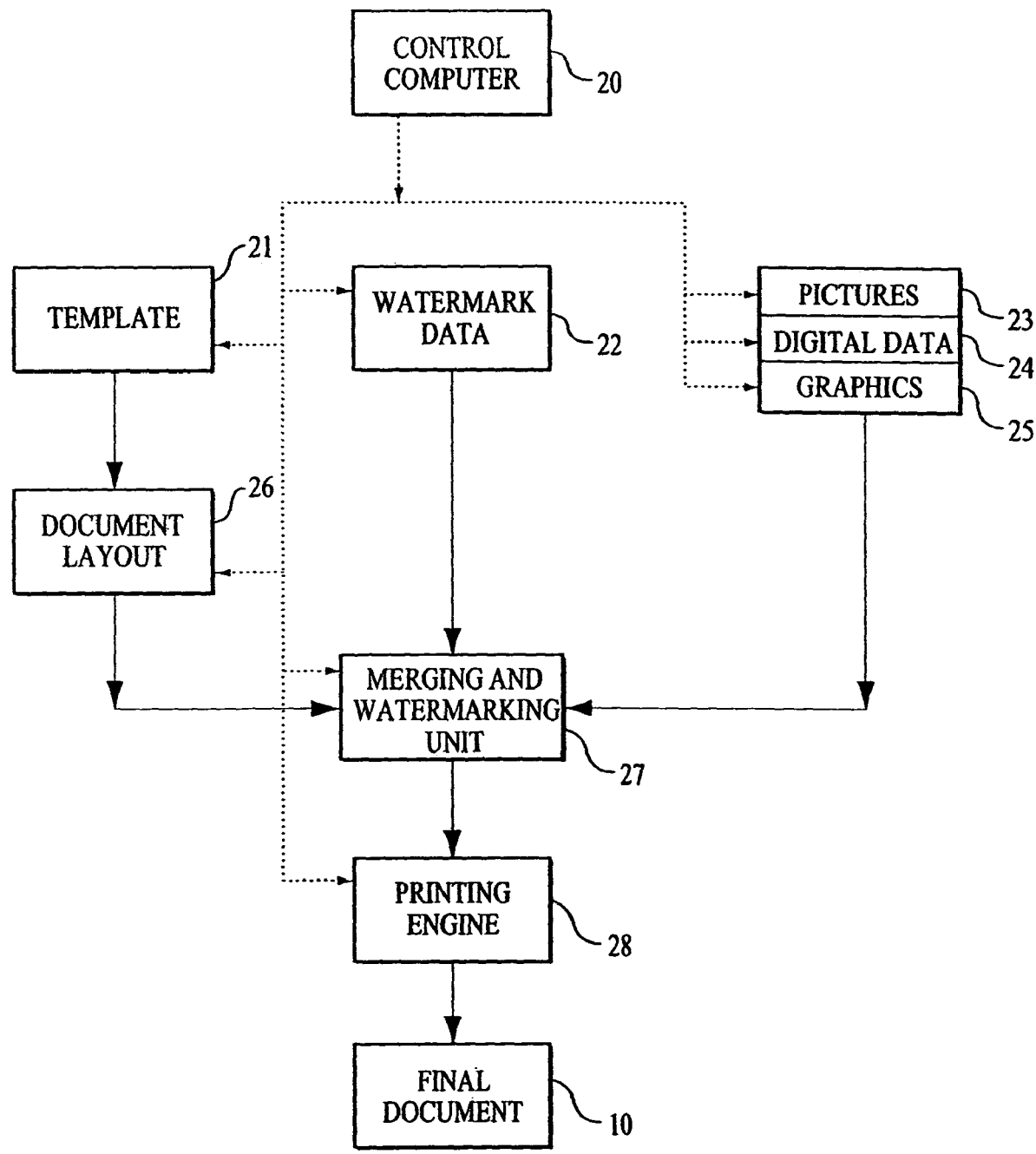
FIG. 13 is an overall diagram of a system to produce security documents in accordance with another aspect of the present invention.
Figure 14:
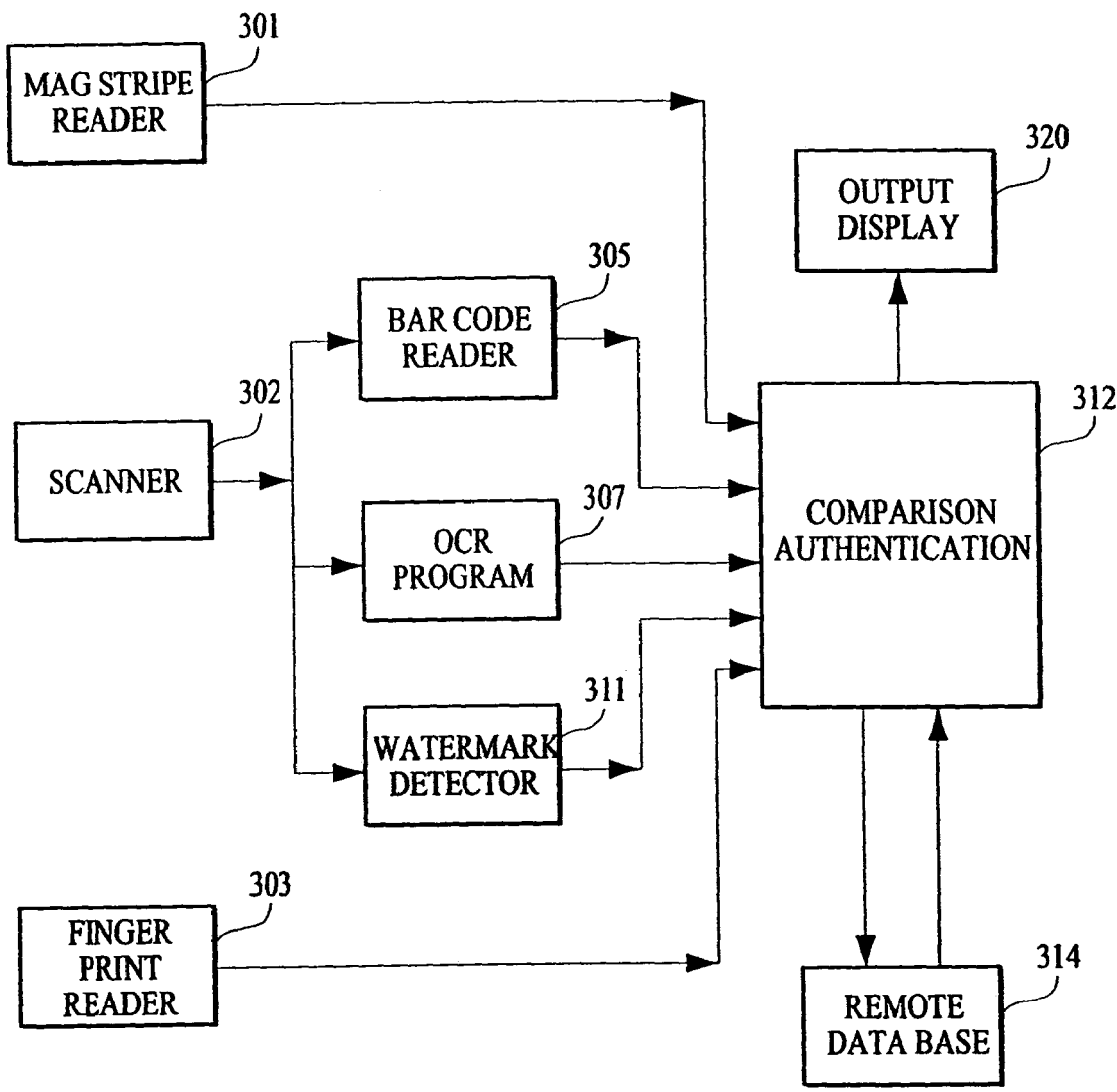
FIG. 14 is a diagram of a document validation system that operates in accordance with various aspects of the present invention.

Self-Authenticating Identification Documents (The reference numbers in this section correspond with FIGS. 12-14).

A diagram of a security document in accordance with one aspect of the present invention is shown in FIG. 12. The security features on the document are a pre-printed background 11, which has an image or pattern (not visible in FIG. 12), which contains a digital watermark. The image in background 11 may contains lines the width of which are varied to carry a watermark in accordance with the technique described in U.S. patent application Ser. No. 09/074,034 filed May 6, 1998 (now U.S. Pat. No. 6,449,377), the disclosures of which are incorporated herein in their entirety.

The document also contains a photograph 12, which shows the owner of the document. This photograph 12 contains a watermark such as that described in U.S. Pat. No. 5,841,886, which will issue Nov. 24, 1998. The personalized background 14 can for example be a background image which corresponds to the image 12. While the personalized image 14 corresponds to the photograph 12, in area 14 the image is printed as a background image. Background images of various types are conventional, for example personal checks frequently have background images of animals, mountains, etc. The background text makes it hard to change the human readable text 15 which is printed over the background text. The bottom of the document has machine readable OCR-B text 16 and a Bar code 17.

It should be clearly understood that the document shown in FIG. 12 is merely illustrative of the various elements that can be combined to form a security document. The exact layout can vary depending upon the needs of the particular application. If desired for a particular application, the document can be much more complex than the document shown in FIG. 12. The document can have many more fields and elements than does the document shown in FIG. 12. Furthermore the document could contain the various other known technology for preventing counterfeiting such as special paper and special ink.

Document shown in FIG. 12 can for example be a document such as a driver's license in which case the picture 12 would be a picture of the owner of the license. Graphic image 11 could for example be a state seal. The text 15 could for example include the driver's license number, the owner's age, and the owner's address.

Document 10 can be a passport. In a passport, the hidden digital watermark data in picture 12 and in the other fields could be coordinated as follows:

Watermark contains Correlates to Pre-printed unique document "batch" background 11 number Photo 12: Batch number and passport OCR-B version of passport number, Human readable (cryptographically encoded) passport number, Master document Personalized "hash" of a fingerprint of the holder background 14 which is automatically read Bar code 17 Passport number Watermark in photo 12 (in code not in watermark) OCR-B text 16 Passport number Batch Info in photo 12, back-number (in text not ground 11 And Bar code 17 in watermark).

An important point is that the various elements of hidden and visual information are coordinated in such a manner that the document is self authenticating. The hidden data in one field can be correlated with the hidden data in another field to insure that the document has not been altered.

If for example one tried to alter a document by replacing picture 12 with a different picture, the new picture would either contain no hidden data, or if it were a picture taken from a different document, the numbers stored in the picture would not match the printed information in text field 15.

If the picture from one document were substituted for the picture in a second document, the cryptographically encoded serial numbers could be used to determine the origin of the picture. It is noted that while in the example shown above, both the Batch number and passport number are cryptographically encoded, other numbers such as a serial number or an ID number could also be encoded in a special manner.

FIG. 13 shows an overall diagram of a system for producing document 10. The system includes a number of units, the operation of which is controlled and coordinated by a control computer 20. The following explanation will illustrate how the embodiment shown in FIG. 13 can be used to produce a document such as the document shown in FIG. 12.

A template 21 is used to define the overall characteristics of a document. The characteristics specified by template 21, including the fields on the document, the data printed in any text fields and the watermarks included in each image included on the document.

The template 21 is used by document layout device 26 to layout a particular document for production. Data which is to be included in the watermarks in any image field are stored in Watermark data store 22. Any pictures, text data, and Graphics are stored in units 23, 24 and 25 respectively.

The document layout from unit 26, the digital watermark data from unit 22 and the pictures, text data and graphics from units 23, 24, and 25 are sent to Merging and watermarking unit 27. Unit 27 applies watermarks to pictures and graphics as specified by the layout information from unit 11. Application of the watermarks to the pictures and graphics can be done in a conventional manner; however, prior to sending the watermark payload (i.e. the data stored in the watermark) to the watermarking engine, the data can be passed through a conventional encryption program. Encrypting the payload data provides an added assurance that a counterfeiter could not make a counterfeit document. The level of encryption could be any level appropriate tot he value of the document.

The output from the Merging and watermarking unit 27 is then sent to a conventional printing engine 28 which produces a final document 10.

Watermark Data storage 22, picture storage 23, digital data storage 24 and graphics storage 25 can be conventional data storage servers. Physically they could all be provided by one physical storage unit. Template input unit 21 is a conventional interactive terminal or personal computer with a graphic design program. Merging and watermarking unit 27 can be a conventional watermarking engine.

The system shown in FIG. 13 produces various parts of the security document in a single step, thereby making it much harder to replace one element on a security document with a similar element from another document.

FIG. 14 is a diagram of a document self authentication unit in accordance with one aspect of the present invention. The system has three input units, each of which is conventional and commercially available. The input units are a magnetic stripe reader 301, a high resolution image scanner 302, and a fingerprint reader 303. The document 10, shown in FIG. 12 does not include a magnetic stripe, but one of the alternatives for such a document is to include a magnetic stripe.

The output from scanner 305 goes to three units (that is, to three computer programs) 305, 307 and 311. Alternatively, the bar code reader 305 could be a separate unit which directly reads the bar code and provides information to comparison and authentication unit 312.

If the bar code reader 305 is a computer program which receives information from the output of scanner 302, the program 305 will read the bar code 17. OCR program 307 reads the text 15 and the text 16 and watermark detector 311 reads the watermarks in images 11, 12 and 14.

An authentication and comparison unit 312 which compares the data from units 305, 307, 311 and 303 to determine if the data matches. If the data in some of the watermarks is encrypted, the comparison and authentication unit 312 would include an appropriate decryption program. The decryption program in unit 312 could obtain the decryption key from remote data base 314 in response to the number read by one of the devices. Alternatively, the encrypted data could be automatically sent to a central facility for decryption. The unit 312 can also access a remote database 314 to determine if there is any special handling that is required for the document that has been presented. For example database 314 could contain information about passports that have been cancelled for various reasons. The resulting information is displayed on a display unit 320.

Miscellaneous

In related embodiments, steganographically-embedded data need not—itself—match human-perceptible information on an identification document (e.g. text). Instead, the correspondence can be effected through, e.g., a remote database. In such an example, the embedded data can be an index into a remote database. A record in the database identified by this index can contain information on the card owner, including the card-owner's name. Thus, to authenticate the user, the index is steganographically decoded from the image, and the database then checked to confirm that the owner name corresponding to that index matches the owner name printed on the card.

Controlled-Access ID

Just as the above-described embodiment employed an inkjet printer to produce a customized-Bedoop greeting card, the same principles can likewise be applied to access-control objects, such as photo-IDs.

Consider an employment candidate who will be interviewing at a new employer. The candidate's visit is expected, but she is not recognized by the building's security personnel. In this, and many other applications, arrangements like the following can be used:

The employer e-mails or otherwise sends the candidate an access code. (The code can be encrypted for transmission.) The code is valid only for a certain time period on a given date (e.g., 9:00 a.m.-11:00 a.m. on Jun. 28, 1999).

Upon receipt of the access code, the candidate downloads from the web site of the state Department of Motor Vehicles the latest copy of her driver's license photo. The DMV has already encoded this photo with Bedoop data. This data leads to a state-run DNS leaf node server. When that server is presented with a UID decoded from a photograph, the server accesses a database and returns to the inquiring computer a text string indicating the name of the person depicted by the photograph.

The candidate incorporates this photo into an access badge. Using a software application (which may be provided especially for such purposes, e.g., as part of an office productivity suite such as Microsoft Office), the photo is dragged into an access badge template. The access code emailed from the employer is also provided to this application. On selecting "Print," an inkjet printer associated with the candidate's computer prints out an access badge that includes her DMV photo and her name, and is also steganographically encoded in accordance with the employer-provided access code.

The name printed on the badge is obtained (by the candidate's computer) from the DMV's DNS server, in response to Bedoop data extracted from the photograph. (In this application, unlike most, the photograph is not scanned as part of a Bedoop process. Instead, the photograph is already available in digital form, so the Bedoop decoding proceeds directly from the digital representation.)

For security purposes, the access code is not embedded using standard Bedoop techniques. Instead, a non-standard format (typically steganographic) is employed. The embedding of this access code can span the entire face of the card, or can be limited to certain regions (e.g., excluding the region occupied by the photograph).

On the appointed day the candidate presents herself at the employer's building. At the exterior door lock, the candidate presents the badge to an optical sensor device, which reads the embedded building access code, checks it for authenticity and, if the candidate arrived within the permitted hours, unlocks the door.

Inside the building the candidate may encounter a security guard. Seeing an unfamiliar person, the guard may visually compare the photo on the badge with the candidate's face. Additionally, the guard can present the badge to a portable Bedoop device, or to one of many Bedoop systems scattered through the building (e.g., at every telephone). The Bedoop system extracts the Bedoop data from the card (i.e., from the DMV photograph), interrogates the DMV's DNS server with this Bedoop data, and receives in reply the name of the person depicted in the photograph. (If the Bedoop system is a telephone, the name may be displayed on a small LCD display commonly provided on telephones.)

The guard checks the name returned by the Bedoop system with the name printed on the badge. On seeing that the printed and Bedoop-decoded names match (and optionally checking the door log to see that a person of that name was authorized to enter and did so), the security guard can let the candidate pass.

It will be recognized that the just-described arrangement offers very high security, yet this security is achieved without the candidate ever previously visiting the employer, without the employer knowing what the candidate looks like, and by use of an access badge produced by the candidate herself.

Variants of such home-printed badge embodiments find numerous applications. Consider purchasing movie- or event-tickets over the web. The user can print an access ticket that has an entry code embedded therein. On arriving at the theater or event, the user presents the ticket to an optical scanning device, which decodes the entry code, checks the validity of same, authorizes the entry, and marks that entry code as having been used (preventing multiple uses of tickets printed with the same code).

Drivers Licenses and Other Cards

Such documents can also be used to access other personal data. One example is e-mail. A traveler might pause at a Bedoop kiosk at an airport and present a driver's license. Without anything more, the kiosk may present email that is waiting for the traveler on an associated display screen.

On recognizing a driver's license, the kiosk can access a remote site (which may be maintained by the Department of Motor vehicles, another government entity, a private entity, or by the traveler), authenticating the operation by presenting Bedoop data encoded on the license, and obtain information that the person has pre-approved for release in response to such authorized access. This information can include e-mail account and password information. Using this information, the kiosk queries the corresponding e-mail server, and downloads a copy of recently received mail for presentation at the kiosk. (A user-entered PIN number may be required at some point in the process, e.g., in querying the remote site for sensitive e-mail password data, before presenting the downloaded e-mail for viewing, etc., to ensure privacy.)

Figure 11:
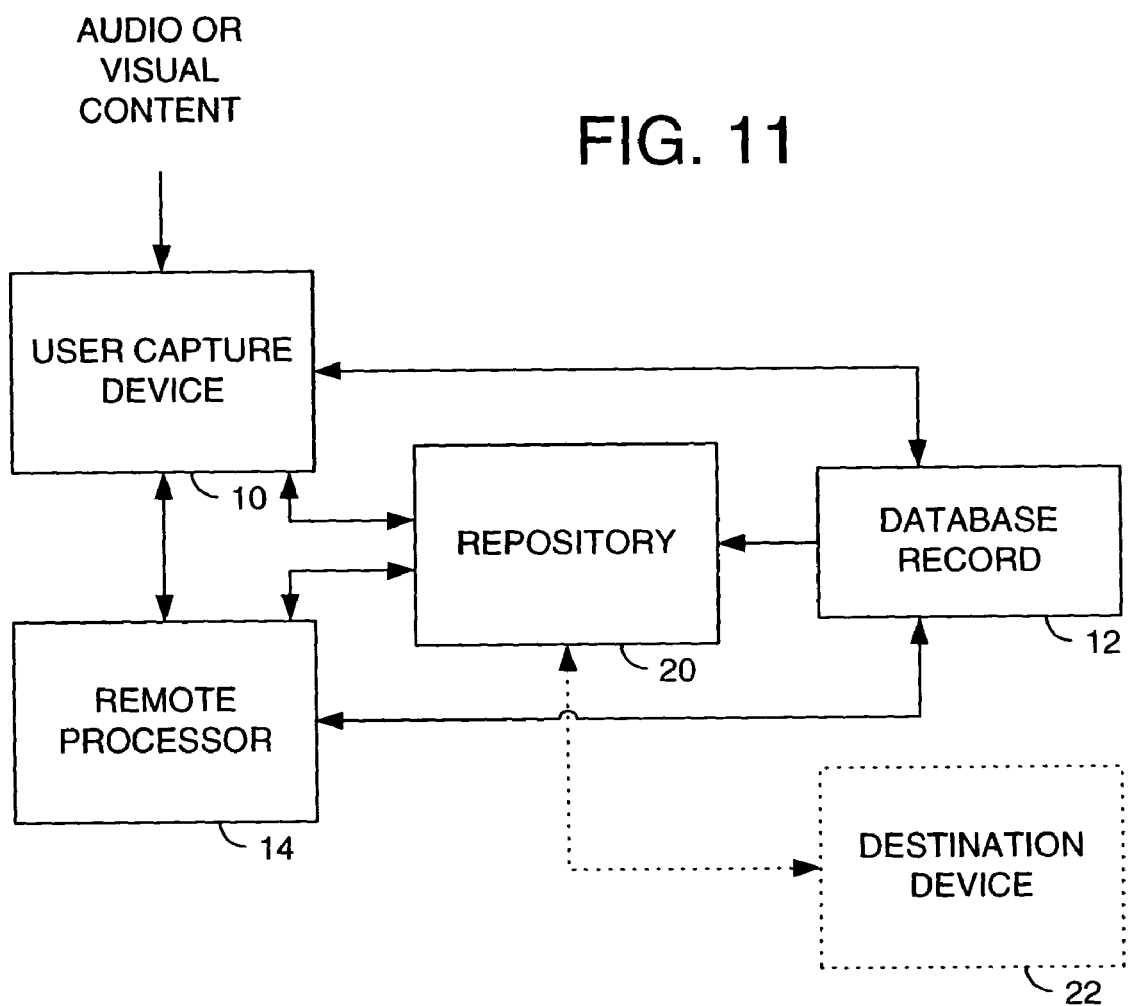
FIG. 11 is a general block diagram that illustrates various embodiments.

Operating Environment for Computer Implementations (The reference numbers in this section correspond to FIG. 11.).

In accordance with another embodiment (FIG. 11), a camera-equipped cell phone (e.g., as announced by Sanyo/PacketVideo), a personal digital assistant (e.g., Palm Pilot), a wrist camera watch (e.g., the Casio WQV1-1CR), a digital camera, or another portable device 10 with imaging capability, captures one or more frames of image data. (Image data is used to illustrate the same technology. The same principles are equally applicable with sound data. In such case the user device 10 can be a cell phone, an MP3 player/recorder, or other device with audio capture capability.)

In response to a user command (e.g., a dedicated physical or virtual (UI-implemented) button, or a series of keystrokes, etc.), or autonomously (e.g., whenever an image is captured), the device 10 transmits the image data to a remote processor 14. (The remote processor may be the user's home computer, or a server computer serving many users, or another remote computer, etc. The transmission may be by wireless or by a wired connection. The transmission can occur immediately, or the data can be stored in a memory in the device 10 and relayed at a later time, e.g., when network connectivity is established.)

The remote processor 14 performs a watermark decoding operation on the received image data, and extracts a watermark payload. Address information associated with this payload (e.g., a URL stored in a database record 12 indexed by an ID part of the payload, or a URL directly represented in the payload) is then obtained, and used to access an on-line resource 20 (e.g., a web page or music server) that provides content back to a desired destination device for storage or rendering. The destination device can be an output device associated with the user (e.g., a display screen or an audio transducer, either integrated with the image capture device 10, or separate). Or it can be a home media appliance, permitting the user to view or listen to the content upon returning home.

Figure 15:
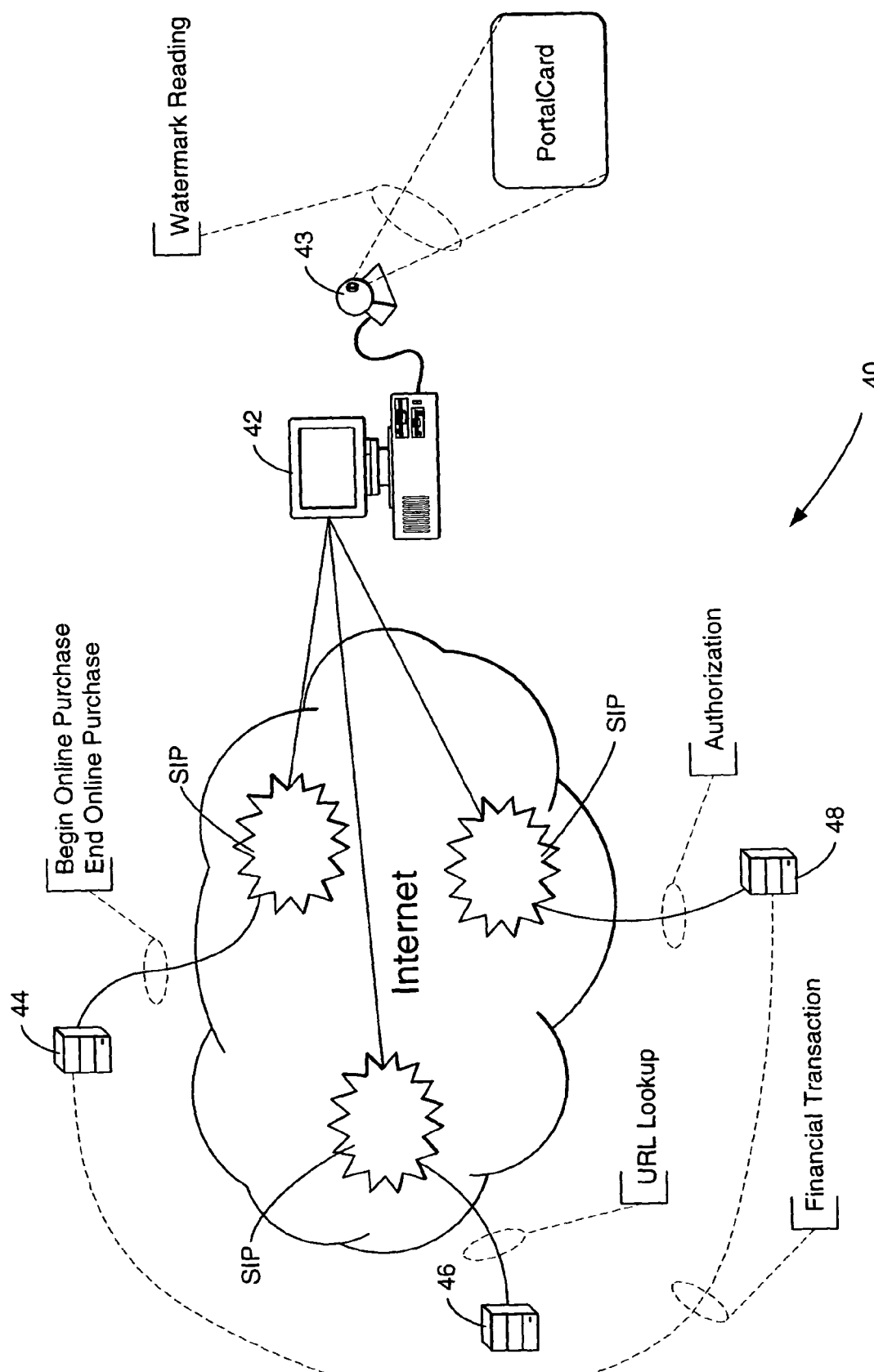
FIG. 15 illustrates a system according to an implementation of the present invention.
Figure 16:
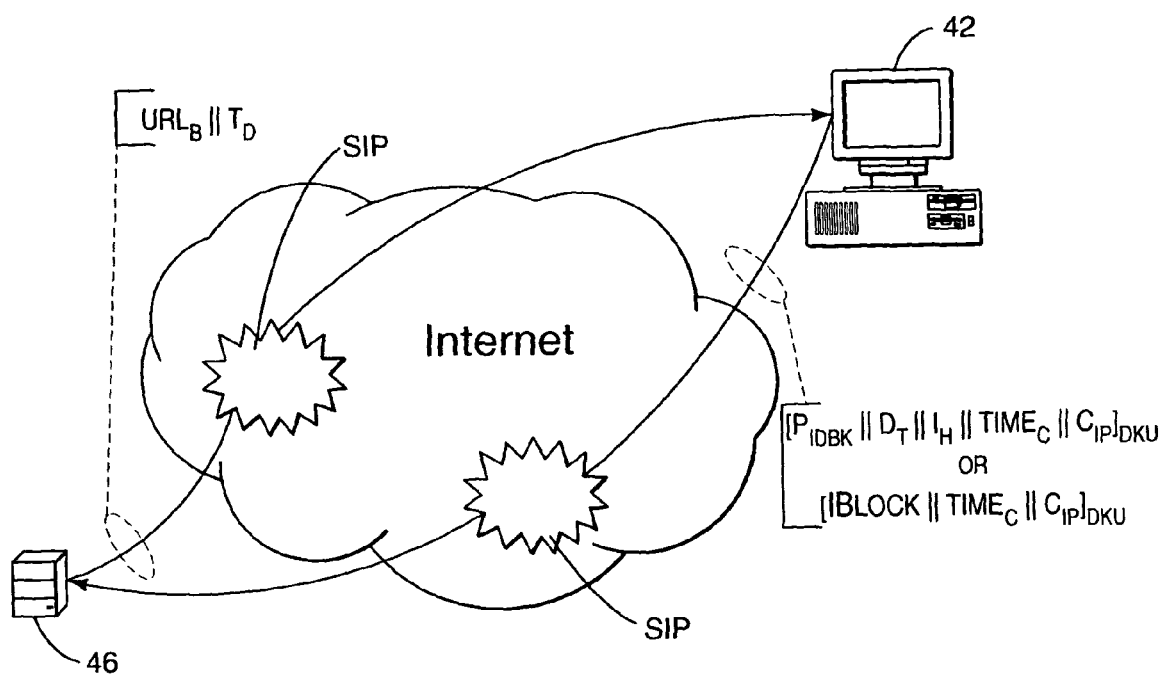
FIG. 16 illustrates various functionality of the FIG. 15 system.

Digital Watermarking Systems (The reference numbers in this section correspond to FIGS. 15-16.).

In accordance with one implementation of the present invention, a document includes plural-bit digital data steganographically encoded therein (e.g., by digital watermarking). The document can be a photo ID (e.g., a driver's license, student ID, or passport), a value document (e.g., a banknote, stock certificate, or other financial instrument), a credit card, a product manual, bank or credit account card, registration card, or virtually any other type of document.

The following discussion is presented to summarize some of the features and functionality of system 40 as shown in FIG. 15. A user begins an online purchase by accessing a merchant website. A decoder, residing on the user's site, reads (or identifies) a watermarked document. The client residing on a user terminal contacts a central site to obtain a URL for a financial institution's authentication server and to get a session ticket. The client contacts the financial institution's server via the URL and passes the session ticket to the bank to obtain an authorization ticket. The client then passes the authorization ticket to the merchant. The merchant includes the authorization ticket in its financial transaction with the financial institution. Preferably, these steps are seamlessly carried out by the user's computer (e.g., the client software), in conjunction with the merchant website, central site, and financial institution site.

As shown in FIG. 16, the user terminal 42 contacts and establishes a secure communications channel with the central site 46. The user terminal 42 passes a request to the central site 46. The request preferably includes the encrypted document ID ($P_{IDBK}$), document type ($D_T$), unique image hash ($I_H$), the user terminal's IP address ($C_{IP}$), and a timestamp ($TIMEc$) of the request. Of course, the request could include more or less information depending on need and system implementation. Encrypting the request with a central site public key ($_{DKU}$) provides additional security. In FIG. 16 the encrypted request is represented by:

$$[P_{IDBK}\|D_T\|I_H\|TIME_C\|C_{IP}]_{DKU}.$$

The central site 46 has a corresponding private key to facilitate decryption of the request.

In another alternative arrangement, a watermark is not decoded by the user terminal 42 (e.g., a decoder operating on user terminal 42). Instead, the decoder determines whether a watermark is present within a captured image. If a watermark is present, a block of image data (e.g., all or some of the captured image) is passed as a request to central site 46. Preferably, the request includes the image data ($IB_{LOCK}$), a timestamp ($TIME_C$), and the user terminal's IP address ($C_{IP}$). The request may be encrypted with a central site public key ($_{DKU}$) for additional security. An encrypted request is represented in FIG. 16 as $[IBLOCK\|TIME_C\|C_{IP}]_{DKU}$. The central site 46 decrypts the request and then extracts the watermark from the image data. Additional data (e.g., the encrypted document ID and document type identifier) can then be extracted from the watermark. This alternative arrangement shifts a majority of the decoding from the user terminal 42 to the central site 46. Shifting the decoding away from the user terminal 42 may provide an advantage, particularly if a third party could intercept the data stream from the user terminal 42 to the central site 46. In this alternative arrangement, the intercepted stream will not be in a decoded form—which significantly reduces the amount of revealed data. Also, since the decoding processes (or a majority of the processes) are maintained securely by central site 46, there is less of the decoding algorithms (and/or software code) to attack at the user terminal 42.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

What is claimed is:

1. Apparatus for determining authenticity of a digital representation of an object, the digital representation including embedded first authentication information and the apparatus comprising:
    a storage system in which stored second authentication information is associated with stored reference codes; and
    a processor which receives the digital representation and a reference code associated therewith, the reference code is included in the digital representation, the processor including:
    an authentication information reader, and
    the processor: i) employing the reference code to retrieve the second authentication information associated therewith from the storage system, ii) employing the authentication information reader to recover the embedded first authentication information, and iii) employing recovered first authentication information and the second authentication information to determine authenticity of the digital representation.

2. Apparatus for determining authenticity of a digital representation of an object, the digital representation including embedded first authentication information and the apparatus comprising:
    a storage system in which stored second authentication information is associated with stored reference codes; and
    a processor which receives the digital representation along with a reference code associated therewith, the processor including:
    an authentication information reader, and
    the processor: i) employing the reference code to retrieve the second authentication information associated therewith from the storage system, ii) employing the authentication information reader to recover the embedded first authentication information, and iii) employing recovered first authentication information and the second authentication information to determine authenticity of the digital representation, wherein:

a key is stored in the storage system and associated with the reference code; and the processor further employs the reference code to retrieve the key; and the authentication information reader uses the key to read the first authentication information.

3. The apparatus set forth in claim 1 wherein:

the second authentication information is based on semantic information contained in the digital representation; and the authentication information reader includes a semantic information reader and an authentication information maker.

4. The apparatus set forth in claim 1 wherein:

the processor is attached to a network, receives the digital representation from a source thereof via the network, and provides an indication of the authenticity of the digital representation to the source.

5. The apparatus set forth in claim 4 wherein:

the source makes the digital representation from an analog form.

6. The apparatus set forth in claim 5 wherein:

the source associates the reference code with the digital representation.

7. The apparatus set forth in claim 6 wherein:

the source receives the reference code from a user of the source.

8. The apparatus set forth in claim 5 wherein:

the analog form includes a security pattern;

the source reads the security pattern and associates the security pattern with the digital representation; and the authentication information reader further processes the embedded first authentication information with the associated security pattern to produce the first authentication information.

9. The apparatus set forth in claim 4 wherein:

there is a plurality of the apparatuses in the network; and a given one of the apparatuses uses the reference code to route the received digital representation and the reference code to another one of the apparatuses.

10. The apparatus set forth in claim 5 wherein:

the embedded first authentication information is a cryptographic hash embedded as a watermark in a graphic on or in the analog form.

11. Apparatus for checking the authenticity of an analog form, the analog form including embedded first authentication information and the apparatus comprising:

an analog form converter that receives the analog form and makes a digital representation of at least the first authentication information; and a communications system, the analog form converter employing the communications system to send the digital representation and a reference code to a verification system, the reference code is included in the digital representation, the verification system employs the reference code and the first authentication information to determine whether the analog form is authentic and to receive a notification whether the analog form is authentic from the verification system.

12. Apparatus for checking the authenticity of an analog form, the analog form including steganographically embedded first authentication information and the apparatus comprising:

an analog form converter that receives the analog form and makes a digital representation of at least the steganographically embedded first authentication information; and a communications system, the analog form converter employing the communications system to send the digital representation and a reference code to a verification system that employs the reference code and the steganographically embedded first authentication information to determine whether the analog form is authentic and to receive a notification whether the analog form is authentic from the verification system, wherein the reference code is sent in association with but not as part of the digital representation.

13. The apparatus set forth in claim 11 wherein:

the verification system employs the reference code to locate a key that is required to read the first authentication information.

14. The apparatus set forth in claim 11 wherein:

the verification system employs the reference code to locate second authentication information and additionally uses the second authentication information to determine whether the digital representation is authentic.

15. Apparatus for checking the authenticity of an analog form, the analog form including steganographically embedded first authentication information and the apparatus comprising:

an analog form converter that receives the analog form and makes a digital representation of at least the steganographically embedded first authentication information; and a communications system, the analog form converter employing the communications system to send the digital representation and a reference code to a verification system that employs the reference code and the steganographically embedded first authentication information to determine whether the analog form is authentic and to receive a notification whether the analog form is authentic from the verification system, wherein the analog form converter analyzes the digital representation to determine whether the verification system can check the authenticity of the digital representation before sending the digital representation.

16. The apparatus set forth in claim 11 wherein:

the analog form includes an image in which the first authentication information is embedded.

17. The apparatus set forth in claim 16 wherein:

the analog form is a photo ID, the image is the photo ID's photo, and the reference code is an identification number for the photo ID.

18. A method of determining authenticity of a digital representation of an object, the digital representation including embedded first authentication information and the method including:

receiving the digital representation and a reference code associated therewith in the system;

using the reference code to retrieve second authentication information associated with the reference code;

reading the embedded first authentication information;

employing the first authentication information and the second authentication information to determine authenticity of the digital representation; and routing a signal to a remote system or device based at least in part on the reference code.

19. The method of claim 18 wherein the signal comprises an indication of authenticity of the digital representation or comprises the digital representation.

20. A programmed computing device comprising an electronic processor to perform the method of claim 18.

21. The apparatus of claim 1 in which said processor is operating to perform at least one of the recited functions.

22. The apparatus of claim 2 in which said processor is operating to perform at least one of the recited functions.

23. The apparatus of claim 11 in which said analog form converter is operating to send the digital representation and the reference code to the verification system.

24. The apparatus of claim 12 in which said analog form converter is operating to send the digital representation and the reference code to the verification system.

25. The apparatus of claim 12 in which the analog form converter is operating to receive the notification.

26. The apparatus of claim 15 in which the analog form converter is operating to send the digital representation and the reference code to the verification system.

27. The apparatus of claim 15 in which the analog form converter is operating to receive the notification.

* * * * *